(12) United States Patent
Akiyama

(10) Patent No.: US 9,513,530 B2
(45) Date of Patent: Dec. 6, 2016

(54) OPTICAL SEMICONDUCTOR ELEMENT, METHOD OF CONTROLLING THE SAME AND METHOD OF MANUFACTURING THE SAME

(71) Applicant: FUJITSU LIMITED, Kawasaki-shi, Kanagawa (JP)

(72) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 14/205,756

(22) Filed: Mar. 12, 2014

(65) Prior Publication Data
US 2014/0193113 A1    Jul. 10, 2014

Related U.S. Application Data

(63) Continuation of application No. PCT/JP2011/072814, filed on Oct. 3, 2011.

(51) Int. Cl.
| | |
|---|---|
| *G02F 1/035* | (2006.01) |
| *G02F 1/295* | (2006.01) |
| *G02B 6/26* | (2006.01) |
| *G02F 1/225* | (2006.01) |
| *G02F 1/313* | (2006.01) |
| *G02B 6/293* | (2006.01) |

(52) U.S. Cl.
CPC ......... *G02F 1/2257* (2013.01); *G02B 6/29338* (2013.01); *G02F 1/3133* (2013.01); *G02B 6/29341* (2013.01)

(58) Field of Classification Search
CPC   G02F 1/2257; G02F 2203/15; G02F 2203/20; G02F 2203/21; G02B 6/2934; G02B 6/29343; G02B 6/29338; G02B 6/29341
USPC .......................................... 385/2–5, 8, 9, 32
See application file for complete search history.

(56) References Cited

U.S. PATENT DOCUMENTS

| | | | |
|---|---|---|---|
| 5,166,988 A * | 11/1992 | Bobb ..................... | G01D 5/268 250/227.19 |
| 2002/0037134 A1 * | 3/2002 | Akamatsu et al. ............. | 385/32 |
| 2009/0169149 A1 | 7/2009 | Block | |

FOREIGN PATENT DOCUMENTS

| | | |
|---|---|---|
| JP | 2009-200091 A1 | 9/2009 |
| JP | 2009-282460 A1 | 12/2009 |

OTHER PUBLICATIONS

International Search Report for International Application No. PCT/JP2011/072814 dated Jan. 17, 2012.
Office Action of Chinese Patent Application 201180073700.8 dated Nov. 26, 2015, with full translation of the office action.

\* cited by examiner

*Primary Examiner* — Kaveh C Kianni
*Assistant Examiner* — Hung Lam
(74) *Attorney, Agent, or Firm* — Kratz, Quintos & Hanson, LLP

(57) ABSTRACT

An optical semiconductor element includes a ring modulator, and a light absorbing material provided at a position apart from a path for a modulated light which is guided by the ring modulator, the light absorbing material absorbing a light leaked out of a ring waveguide of the ring modulator, and increasing a temperature of the ring waveguide.

2 Claims, 26 Drawing Sheets

VOLTAGE V

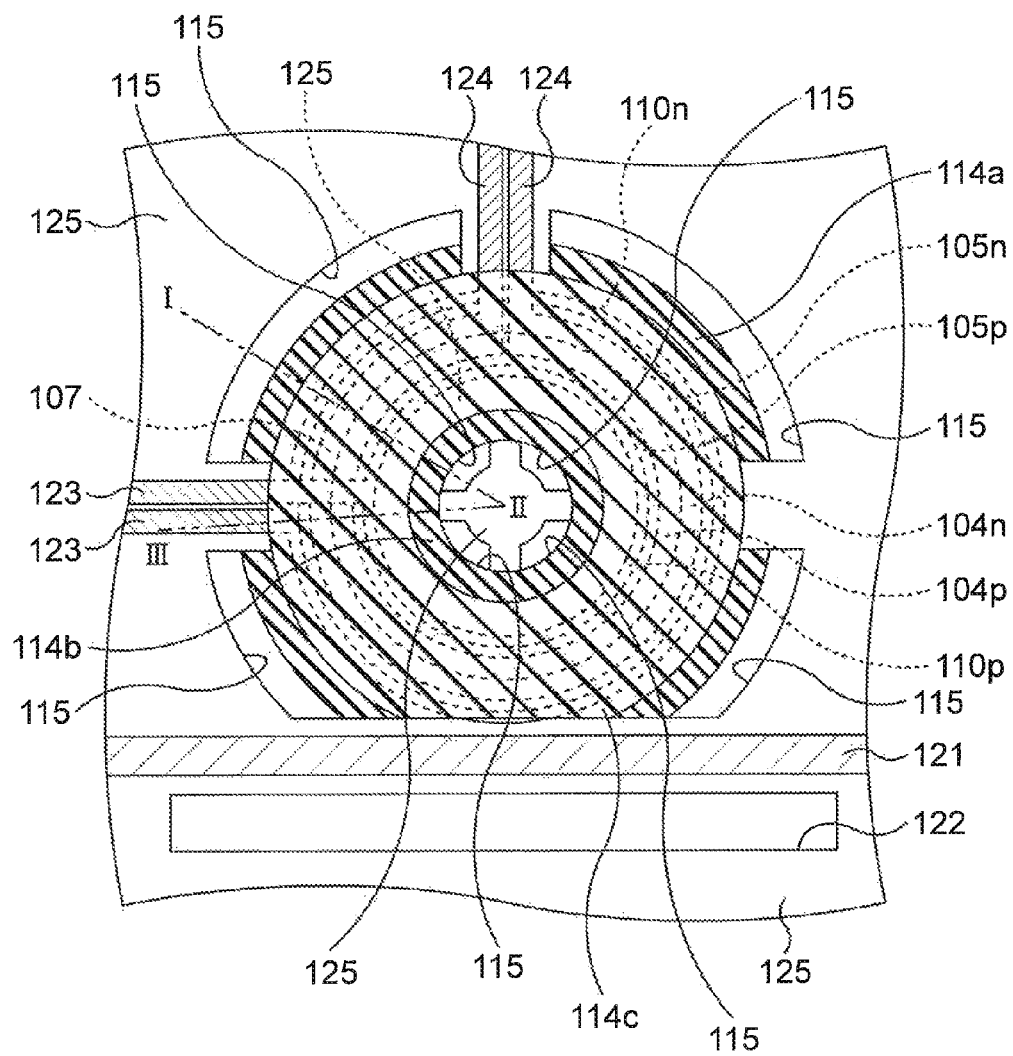

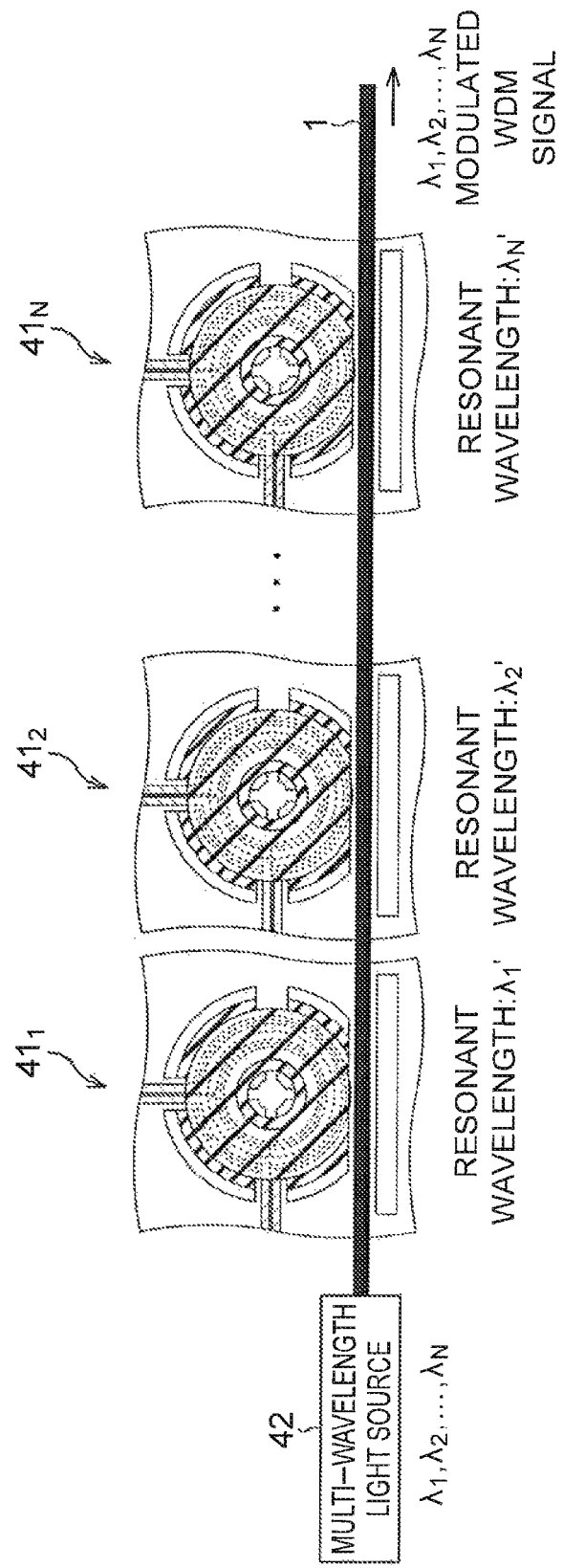

OPTICAL SEMICONDUCTOR ELEMENT, METHOD OF CONTROLLING THE SAME AND METHOD OF MANUFACTURING THE SAME

CROSS-REFERENCE TO RELATED APPLICATION

This application is a continuation application of International Application PCT/JP2011/072814 filed on Oct. 3, 2011 and designated the U.S., the entire contents of which are incorporated herein by reference.

FIELD

The embodiments discussed herein are directed to an optical semiconductor element, a method of controlling the same, and a method of manufacturing the same.

BACKGROUND

Practical application of optical devices using silicon as a material of an optical waveguide is important to enable small sizing, large capacity, and low power consumption of optical transmitting and receiving devices. This is because an optical waveguide whose refractive index difference is large can be used, and therefore, it is advantageous for small sizing compared to other materials. Besides, integration with an electronic circuit is easy, and therefore, it is possible to integrate a number of optical transmitting and receiving devices on one chip. Particularly, characteristics of a modulator among optical devices largely affect on the power consumption and size of optical transmitting and receiving devices. In particular, a ring modulator among modulators is advantageous to enable the small sizing and the low power consumption because an element in itself is small, a modulation voltage is small, and an optical loss thereof is small.

However, in a ring modulator, a wavelength band and a modulation efficiency are in a relationship of tradeoff. Accordingly, when high modulation efficiency is to be obtained, the wavelength band is narrow, and it is difficult to match a wavelength of an incident light such as a CW (continuous wave) light and a resonant wavelength. Arts objecting to solve the above-stated problems have been proposed, but it is difficult to enable a stable control.

Patent Literature 1: U.S. Patent Application Laid-open No. 2009/0169149

Patent Literature 2: Japanese Laid-open Patent Publication No. 2009-200091

SUMMARY

According to an aspect of the embodiments, an optical semiconductor element includes: a ring modulator; and a light absorbing material provided at a position apart from a path for a modulated light which is guided by the ring modulator, the light absorbing material absorbing a light leaked out of a ring waveguide of the ring modulator, and increasing a temperature of the ring waveguide.

According to another aspect of the embodiments, a method of controlling an optical semiconductor element includes: heating an optical semiconductor element to a particular temperature or more with a heater, the optical semiconductor element including: a ring modulator; and a light absorbing material provided at a position apart from a path for a modulated light which is guided by the ring modulator, the light absorbing material absorbing a light leaked out of a ring waveguide of the ring modulator, and increasing a temperature of the ring waveguide; starting incidence of a modulated light to the ring modulator; and after the starting, stopping the heating with the heater. A heating value in a first relationship is larger than a heating value in a second relationship at a ring resonant wavelength giving a maximum to the first relationship, the first relationship being a relationship between a ring resonant wavelength and a heating value according to absorption of a resonance light in the ring waveguide, and the second relationship being a relationship between a heating value and a ring resonant wavelength which changes according to the heating value in the ring waveguide. The particular temperature is a temperature corresponding to a nearest intersection on a short wavelength side from the ring resonant wavelength giving the maximum to the first relationship among intersections between a graphic chart representing the first relationship and a graphic chart representing the second relationship.

According to still another aspect of the embodiments, a method of manufacturing an optical semiconductor element includes: forming a ring modulator; and forming a light absorbing material at a position apart from a path for a modulated light which is guided by the ring modulator, the light absorbing material absorbing a light leaked out of a ring waveguide of the ring modulator, and increasing a temperature of the ring waveguide.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13A is a view illustrating a layout of an optical semiconductor element according to a fifth embodiment;

FIG. 16A is a view illustrating a structure of an optical semiconductor element according to an eighth embodiment;

DESCRIPTION OF EMBODIMENTS

Hereinafter, preferred embodiments will be explained with reference to accompanying drawings.

First Embodiment

Figure 1A:
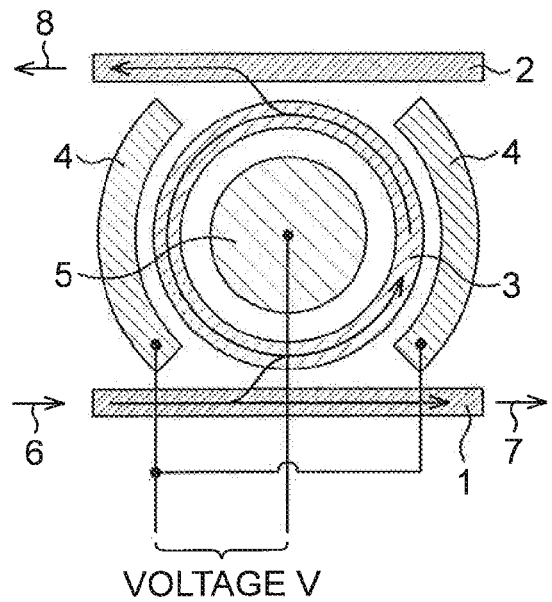
FIG. 1A is a view illustrating an example of a ring modulator.

First, a first embodiment is described. FIG. 1A is a view illustrating an example of a ring modulator. Two straight waveguides 1, 2 and a ring waveguide 3 between them are included in the ring modulator. Modulating electrodes 4 are provided at outside of the ring waveguide 3, and a modulating electrode 5 is provided at inside of the ring waveguide 3.

Figure 1B:
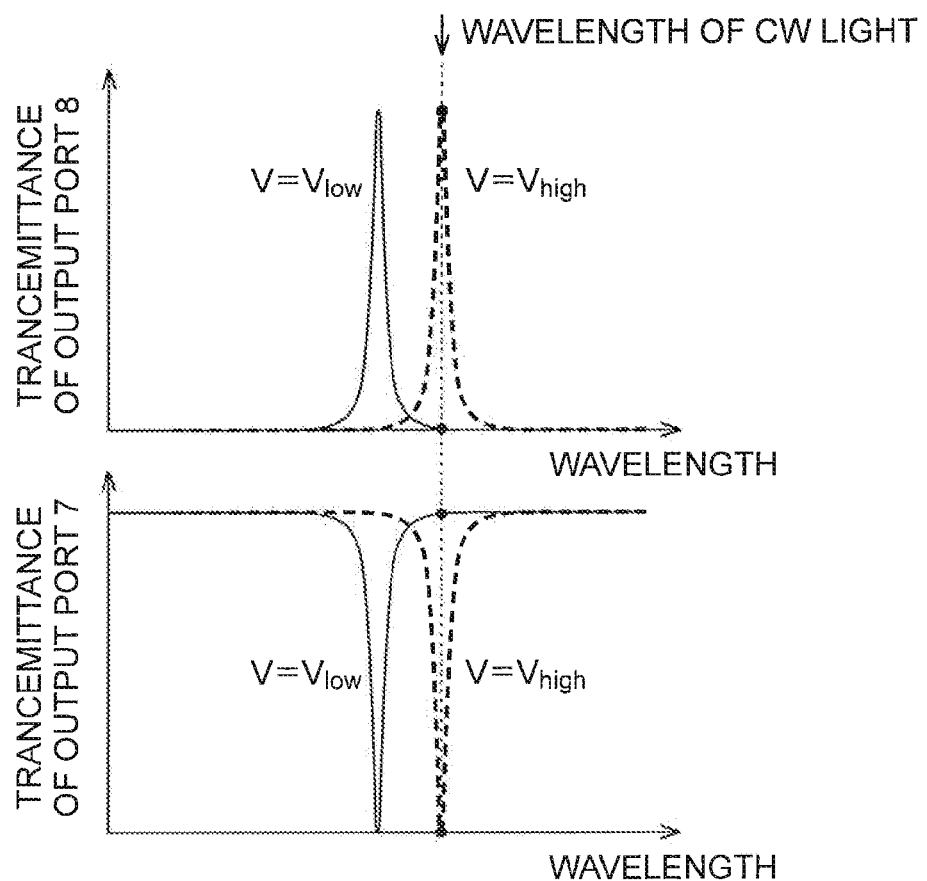
FIG. 1B is a view illustrating characteristics of the ring modulator illustrated in FIG. 1A.

A CW light incident on an input port 6 of the waveguide 1 is guided to an output port 8 of the waveguide 2 when a ring resonant wavelength of the ring waveguide 3 and a wavelength of the CW light are matched. The ring resonant wavelength depends on the circumferential optical path length, and is a specified fraction of an integer of the circumferential optical path length. A CW light incident on the input port 6 of the waveguide 1 is guided to an output port 7 of the waveguide 1 when a ring resonant wavelength of the ring waveguide 3 and a wavelength of the CW light are not matched. A ring resonant wavelength of the ring waveguide 3 changes, if a modulation voltage V applied on the ring waveguide 3 is changed, a refractive index of the ring waveguide 3 is changed, and a circumferential optical path length is changed. Accordingly, a transmittance changes if a wavelength is fixed to a specific one, and therefore, that may be used for a light intensity modulation. For example, in a case where a CW light having a wavelength illustrated in FIG. 1B is incident, a power of an output light to the output port 7 is large when the modulation voltage V is a voltage $V_{low}$, and is small when the modulation voltage V is a voltage $V_{high}$. On the other hand, a power of an output light to the output port 8 is small when the modulation voltage V is the voltage $V_{low}$, and is large when the modulation voltage V is the voltage $V_{high}$. Accordingly, it is possible to obtain signals which have been modulated of light intensity from the output ports 7 and 8 by changing the modulation voltage V between the voltage $V_{high}$ and the voltage $V_{low}$.

Figure 2A:
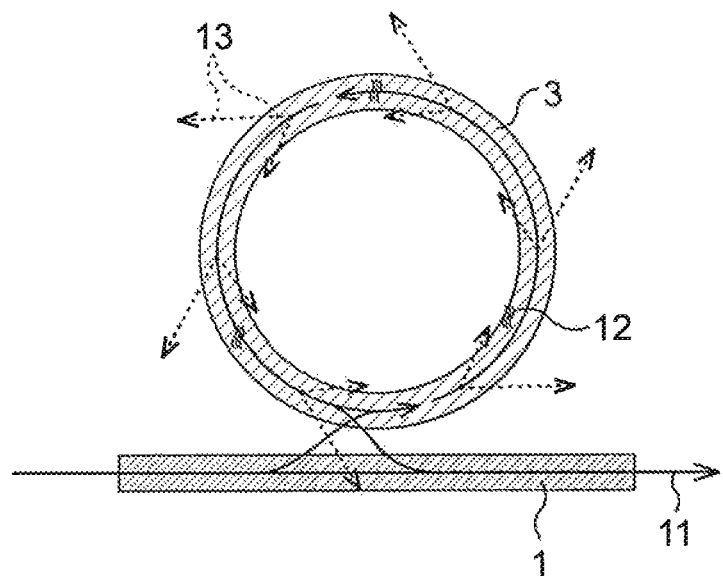
FIG. 2A is a view illustrating another example of a ring modulator.
Figure 2B:
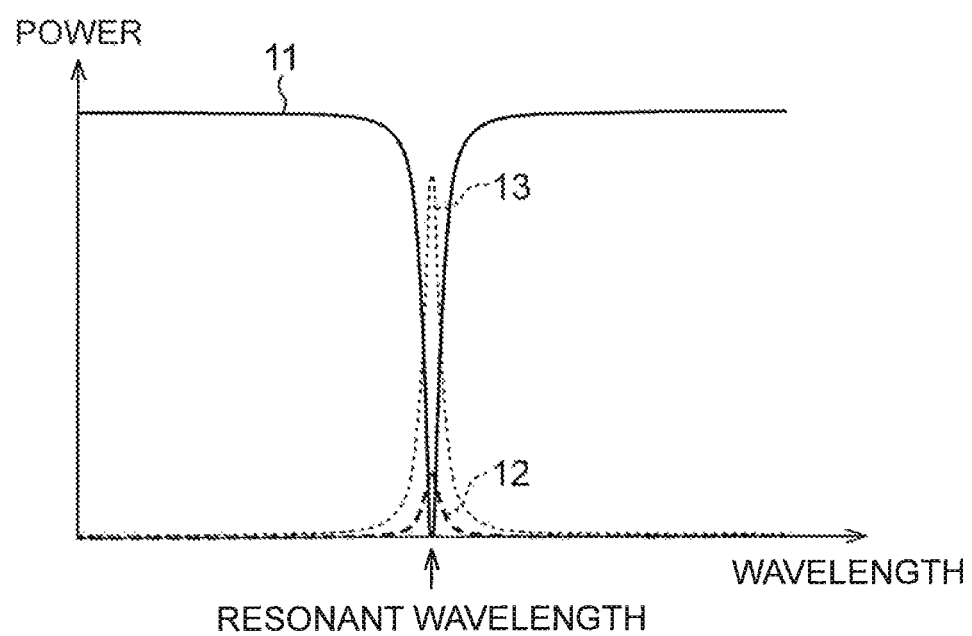
FIG. 2B is a view illustrating characteristics of the ring modulator illustrated in FIG. 2A.

Next, a loss of an incident light is described. Here, it is assumed that the waveguide 2 is not provided as illustrated in FIG. 2A. An incident light circulates in the ring waveguide 3 when a wavelength of the incident light is close to the ring resonant wavelength, and suffers a loss during the circulation in the ring modulator. Accordingly, a power 11 of a transmission light to an output port is small compared to a case when the wavelength of the incident light is far from the ring resonant wavelength, as illustrated in FIG. 2B. There are two kinds in the losses suffered at this time. One of them is a loss caused by being scattered by roughness of a side surface of the ring waveguide 3 and being radiated because the incident light does not turn at a ring curvature. Namely, it is a loss of a power 13 of the light leaked out of the ring waveguide 3. The other one is a loss caused by light absorption by a material of the ring waveguide 3. Namely, it is a loss of a power 12 of the absorbed light. The power 12 of the absorbed light is converted into heat energy, and the ring waveguide 3 generates heat.

Figure 3A:
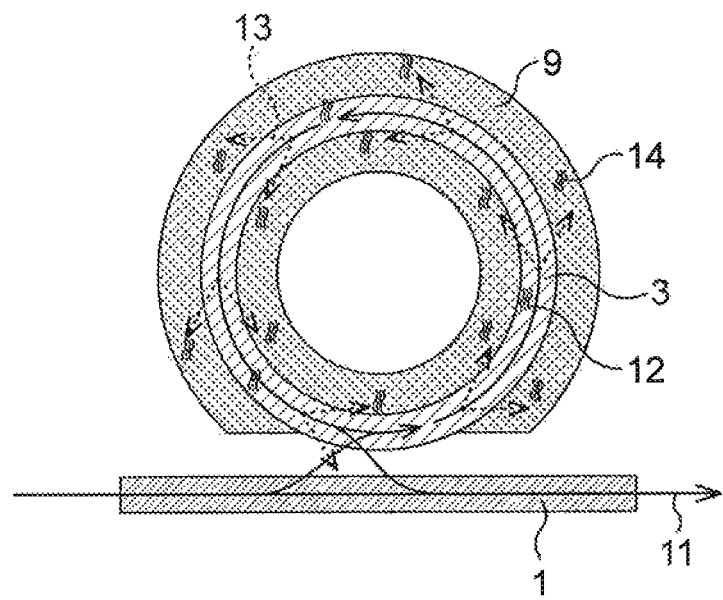
FIG. 3A is a view illustrating still another example of a ring modulator.
Figure 3B:
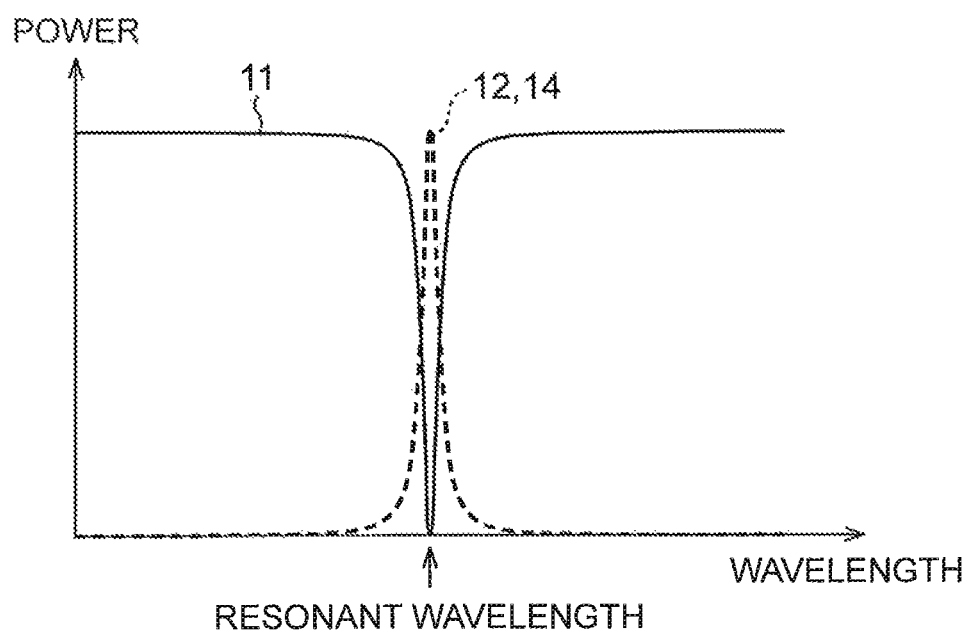
FIG. 3B is a view illustrating characteristics of the ring modulator illustrated in FIG. 3A.

In the first embodiment, as illustrated in FIG. 3A, a light absorbing material 9 is provided at a position apart from a path of the light wave-guiding the ring modulator so as to effectively utilize a light leaked out of the ring waveguide 3. The light absorbing material 9 absorbs the light leaked out of the ring waveguide 3 and increases a temperature of the ring waveguide 3. The light absorbing material 9 absorbs the light and converts a power 13 of the light into a power 14 of heat. Then, the light absorbing material 9 increases the temperature of the ring waveguide 3. As a result, as illustrated in FIG. 3B, the loss of the power of the leaked light is little, and a sum of the powers 12 and 14 contributing to the absorption and heat generation is large. Namely, it is possible to convert energies of the scattered light and the radiated light, which occupies a majority of the energy which is lost when the light absorbing material 9 is not provided, into a heat energy, and to make it contribute to the increase of the temperature of the ring waveguide 3.

Figure 4A:
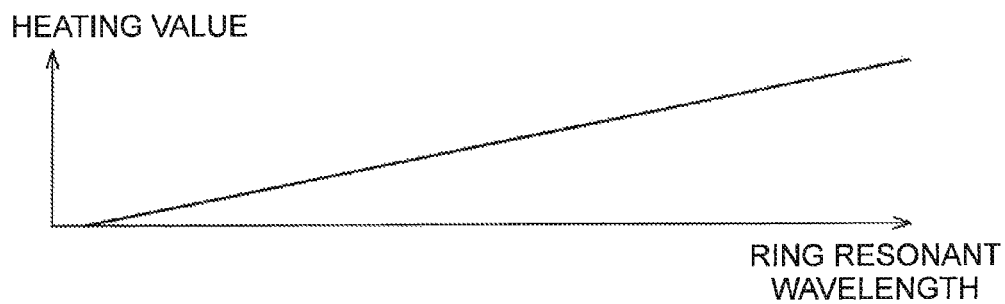
FIG. 4A is a view illustrating a relationship between a heating value and a ring resonant wavelength in a ring waveguide.
Figure 4B:
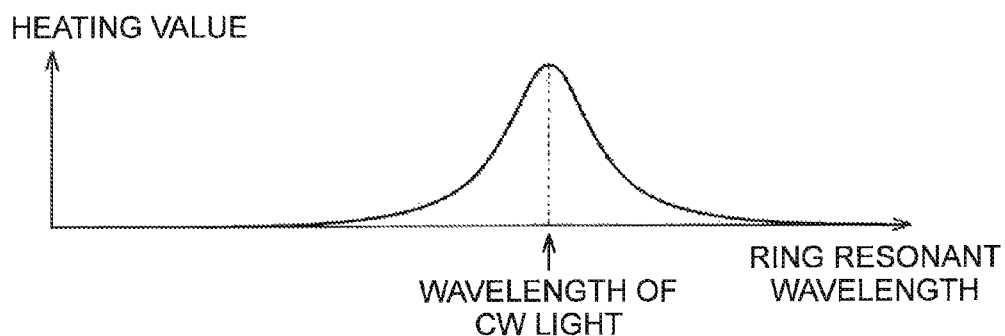
FIG. 4B is a view illustrating a relationship between a heating value according to absorption of a resonance light and a ring resonant wavelength.

Next, an effect according to the increase of the temperature of the ring waveguide 3 is described. In general, a ring resonant wavelength becomes longer with an increase of a refractive index according to a temperature increase of a ring waveguide. Accordingly, there is a relationship as illustrated in FIG. 4A between a heating value and a ring resonant wavelength in a ring waveguide. When a ring resonant wavelength becomes closer to a wavelength of a CW light, a number of circulations of the CW light in the ring waveguide increases, and a heating value increases. Accordingly, there is a relationship as illustrated in FIG. 4B between a heating value according to absorption of a resonance light and a ring resonant wavelength. A heating value and a ring resonant wavelength in a ring waveguide are therefore stabilized at any of three intersections 21, 22, and 23 in FIG. 4C where both the relationship illustrated in FIG. 4A and the relationship illustrated in FIG. 4B are satisfied.

Note that the intersection 22 is an unstable point among the three intersections. For example, when the ring resonant wavelength shifts toward a long wavelength side from the intersection 22, a positive feedback is applied, in which the heating value by the absorption of the resonance light increases, and it becomes further longer wavelength. As a result, it is finally stabilized at the intersection 23. When the ring resonant wavelength shifts toward a short wavelength side from the intersection 22, a positive feedback is applied, in which the heating value by the absorption of the resonance light decreases, and it becomes further shorter wavelength. As a result, it is finally stabilized at the intersection 21. When the ring resonant wavelength is at the long wavelength side from the intersection 22, it stabilizes at the intersection 23, and when the ring resonant wavelength is at the short wavelength side from the intersection 22, it stabilizes at the intersection 21, as represented by arrows on a straight line in FIG. 4C, even when a wider wavelength range is considered without being limited to a periphery of the intersection 22.

Figure 4C:
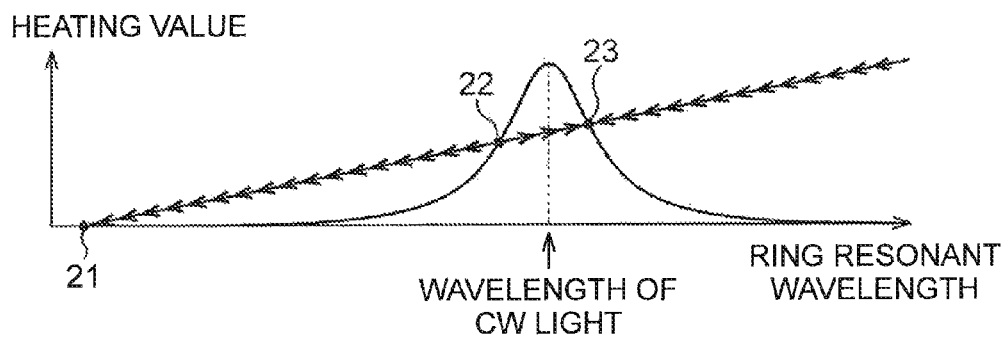
FIG. 4C is a view in which a graphic chart illustrated in FIG. 4A and a graphic chart illustrated in FIG. 4B are overlaid.
Figure 5A:
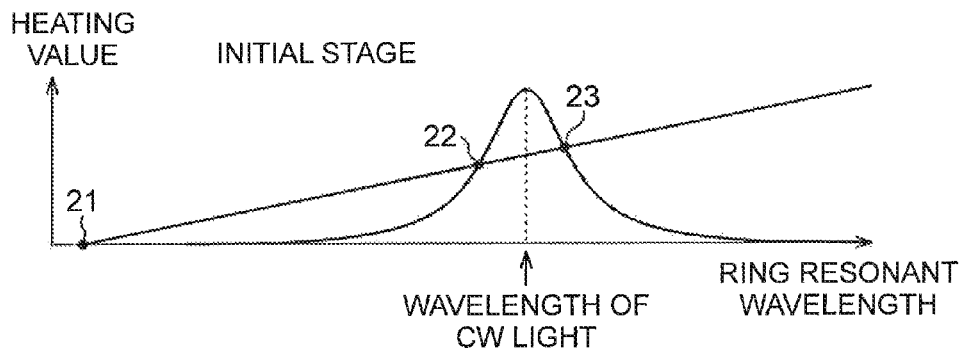
FIG. 5A is a view illustrating characteristics at an initial stage.
Figure 5B:
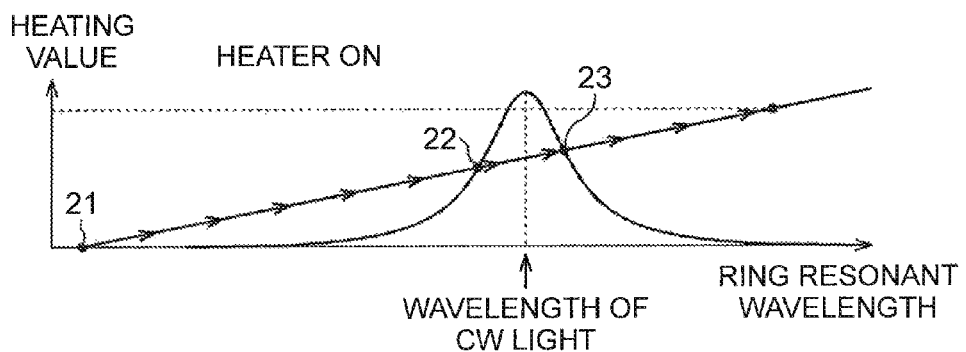
FIG. 5B is a view illustrating characteristics after heating.
Figure 5C:
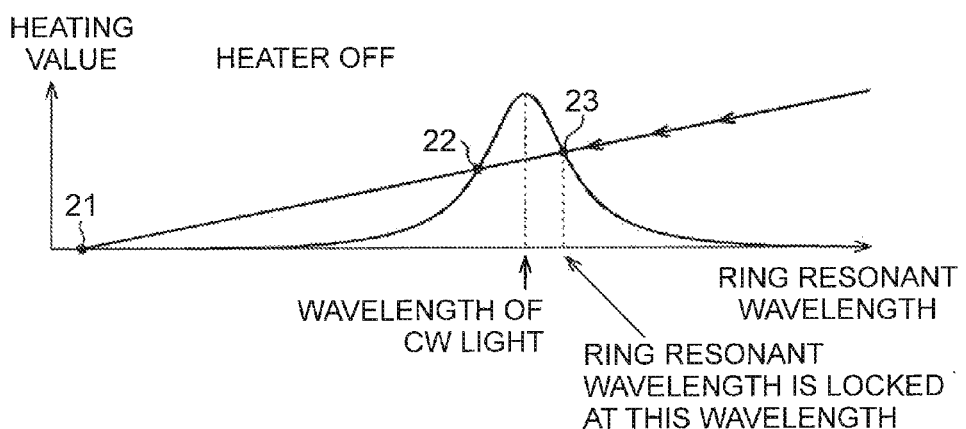
FIG. 5C is a view illustrating characteristics after heating is stopped.

Accordingly, as illustrated in FIG. 4C, a phenomenon as described below occurs in a case where a heating value in a first relationship is larger than a heating value in a second relationship at a ring resonant wavelength (wavelength of CW light) giving a maximum to the first relationship, where the first relationship is a relationship between a ring resonant wavelength and a heating value according to absorption of a resonance light in the ring waveguide, and the second relationship is a relationship between a heating value and a ring resonant wavelength which changes according to the heating value in the ring waveguide. In other words, if a ring modulator having a relationship as illustrated in FIG. 5A in an initial stage is forced to be heated with a heater in order to set a ring resonant wavelength at a long wavelength side from the intersection 22 as illustrated in FIG. 5B, and thereafter the heating is stopped, the ring resonant wavelength is stabilized at the intersection 23, as illustrated in FIG. 5C. Once it is stabilized as stated above, the ring resonant wavelength is locked at the intersection 23 even if the heater is not operated, and therefore, the power consumption of the heater can be set to be zero. Once it is locked, it is automatically continued to be locked, and therefore, observation of an emitted light, a feedback control, and so on are not necessary.

Note that in an example illustrated in FIG. 5B, the heating is performed until the ring resonant wavelength becomes the longer wavelength than the intersection 23, but the heating may be performed such that the ring resonant wavelength becomes the longer wavelength than the intersection 22. Namely, the heating may be performed up to a temperature exceeding a temperature corresponding to a nearest one (intersection 22) at the short wavelength side from the ring resonant wavelength (wavelength of CW light) giving the maximum to the first relationship among the intersections 21 to 23 between the graphic chart (FIG. 4B) representing the first relationship and the graphic chart (FIG. 4A) representing the second relationship.

Figure 6:
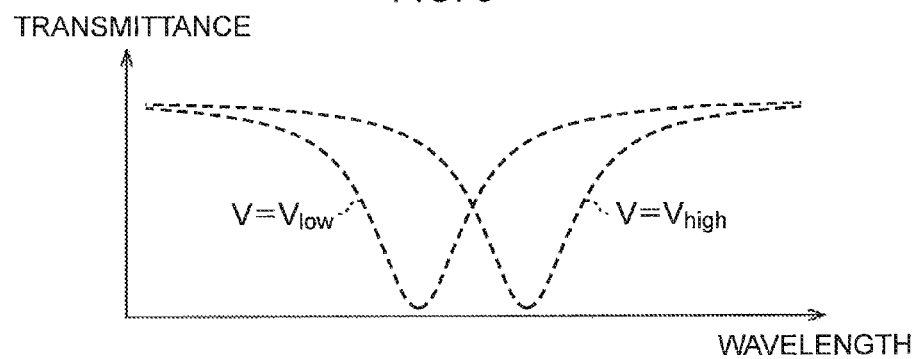
FIG. 6 is a view illustrating a relationship between a modulation voltage V and a transmittance.
Figure 7A:
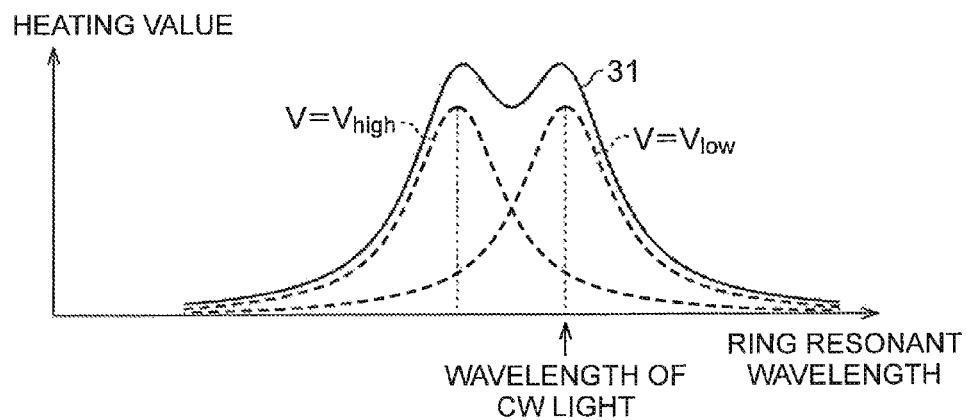
FIG. 7A is a view illustrating a relationship between a ring resonant wavelength and a heating value in consideration of modulation.
Figure 7B:
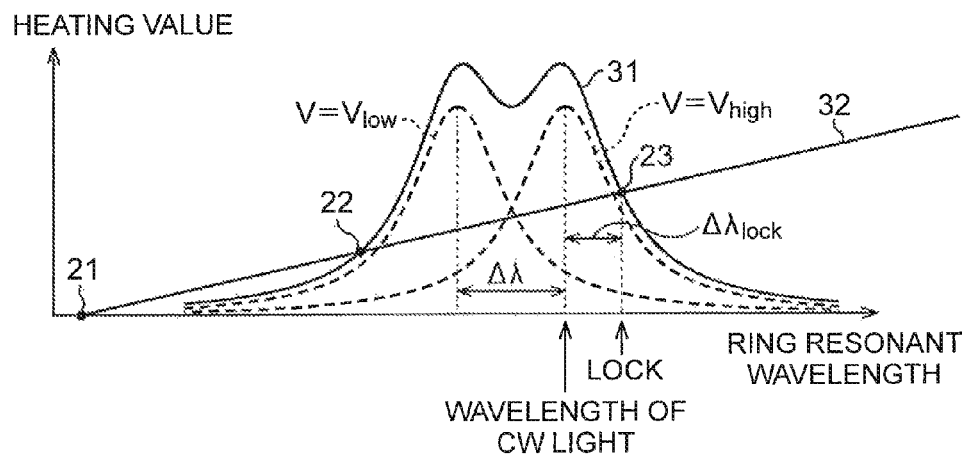
FIG. 7B is a view in which a graphic chart illustrated in FIG. 7A and a graphic chart illustrated in FIG. 4B are overlaid.
Figure 8:
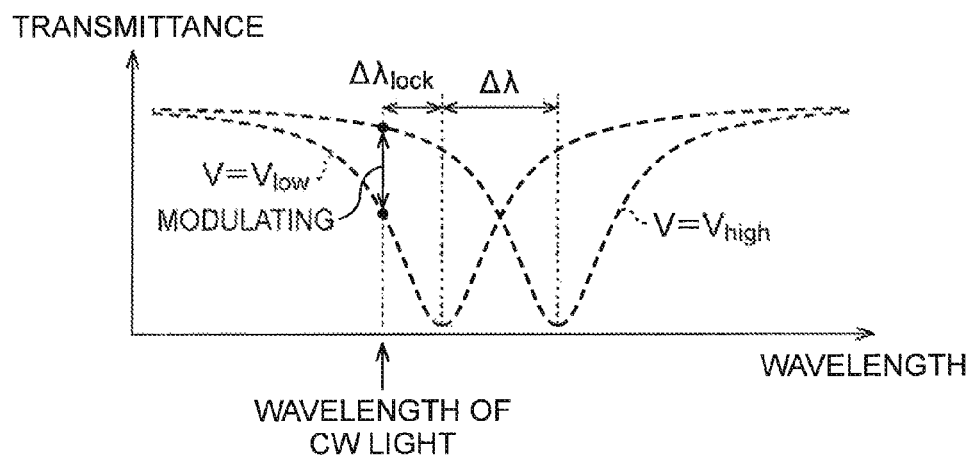
FIG. 8 is a view illustrating a relationship between a graphic chart illustrated in FIG. 6 and a locked wavelength.

The wavelength at the stabilization point as stated above is a wavelength suitable for applying an on/off modulation for the CW light. Hereinafter, that is described. In the ring modulator, as illustrated in FIG. 6, a CW light is modulated by changing the modulation voltage V between the voltage $V_{low}$ and the voltage $V_{high}$ to thereby shift the ring resonant wavelength. The heating value according to the absorption of the resonance light changes in accordance with the modulation voltage V as illustrated in FIG. 7A. The ring resonant wavelength during modulating changes from moment to moment, and therefore, it is not defined uniquely, but in FIG. 7A, it is defined as the ring resonant wavelength when the modulation voltage V is the voltage $V_{low}$ for convenience. As illustrated in FIG. 7A, curves each representing the heating value caused by the absorption of the resonance light change depending on a case where the modulation voltage V is the voltage $V_{low}$ and a case where the modulation voltage V is the voltage $V_{high}$. A temperature of the ring waveguide changes slowly in reaction to switching of the modulation voltage V. Accordingly, when a mark ratio is 50%, time-averages of these two curves corresponds to a curve 31 representing the heating value according to the resonance light absorption. It is possible to stabilize the ring resonant wavelength at the intersection 23 by shifting the ring resonant wavelength toward the long wavelength side from the intersection 22 with the heater, and thereafter stopping the heating, even when the modulation is applied as stated above, as illustrated in FIG. 7B as same as the relationship represented in FIG. 5A to FIG. 5C. At this time, the wavelength of CW light is at a position illustrated in FIG. 8 relative to a transmission spectrum, and the ring resonant wavelength is locked at a wavelength capable of applying modulation between the transmittance of the voltage $V_{low}$ and the transmittance of the voltage $V_{high}$.

Figure 9:
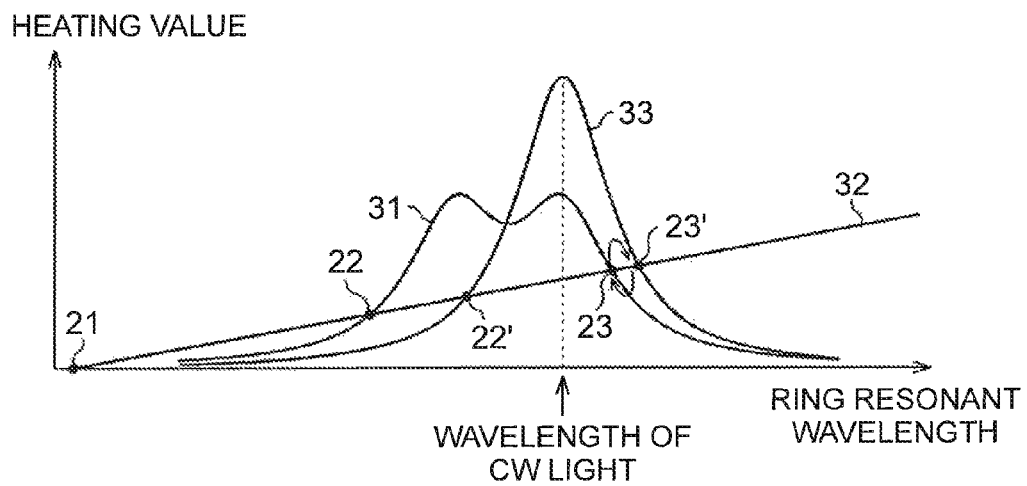
FIG. 9 is a view illustrating operations for a burst signal in which a burst-off state and a burst-on state are mixed.

Note that it is possible to continue to lock a ring resonant wavelength at a modulated light also for a burst signal in which a state without a signal (burst-off state) and a state with a signal (burst-on state) are mixed. Namely, as illustrated in FIG. 9, it is possible to continue to lock a ring resonant wavelength at a modulated light also for a burst signal in which a state in which the modulation voltage V is constantly the voltage $V_{low}$ (burst-off state) and a stake in which the modulation voltage V is switched at random between the voltage $V_{low}$ and the voltage $V_{high}$ (burst-on state) are mixed. In FIG. 9, a case where the mark ratio of the burst-on state is 50%. Intersections between a curve 33 and a straight line 32 under the burst-off state are different from the intersections 22, 23 between the curve 31 and the straight line 32 under the burst-on state. Here, the intersections under the burst-off state corresponding to the intersections 22, 23 are described as 22', 23'.

When a state is switched into the burst-off state when the ring resonant wavelength is locked at the intersection 23 under the burst-on state, the intersection 23 comes to be not a stable state. Note that the intersection 23' positions at the long wavelength side from the intersection 22', and therefore, it is finally stabilized at the intersection 23'. When the state is switched into the burst-on state under a state when the ring resonant wavelength is stabilized at the intersection 23', the intersection 23' similarly comes to be not the stable state, but it positions at the long wavelength side than the intersection 22, and therefore, the ring resonant wavelength is stabilized at the intersection 23. As stated above, when the burst-on state and the burst-off state are switched, the ring resonant wavelength transits between the intersection 23 and the intersection 23'. Even if the transition as stated above occurs, the lock is not disengaged, and it is possible to return to the intersection 23 when the state becomes the burst-on state.

Second Embodiment

Figure 10A:
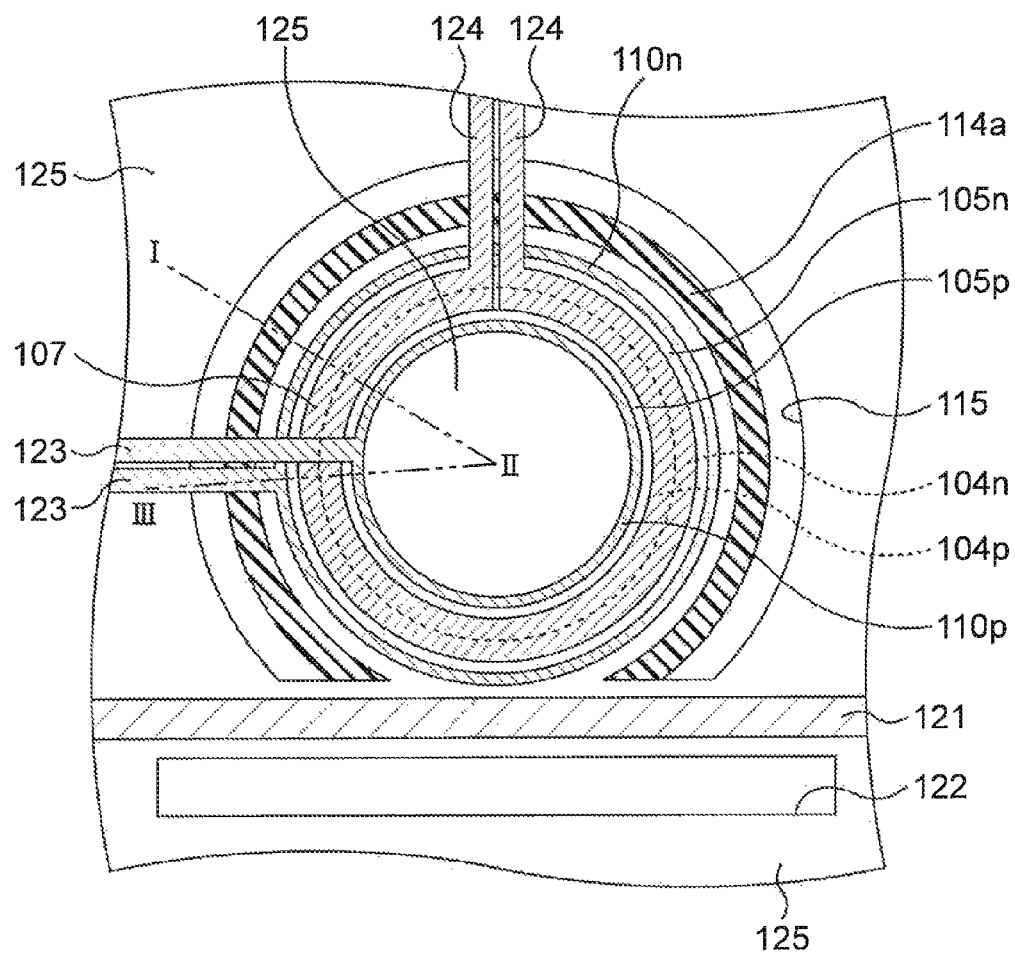
FIG. 10A is a view illustrating a layout of an optical semiconductor element according to a second embodiment.

Next, a second embodiment is described. FIG. 10A is a view illustrating a layout of an optical semiconductor element according to the second embodiment, FIG. 10B is a sectional view along a I-II line in FIG. 10A, and FIG. 10C is a sectional view along a III-II line in FIG. 10A.

Figure 10B:
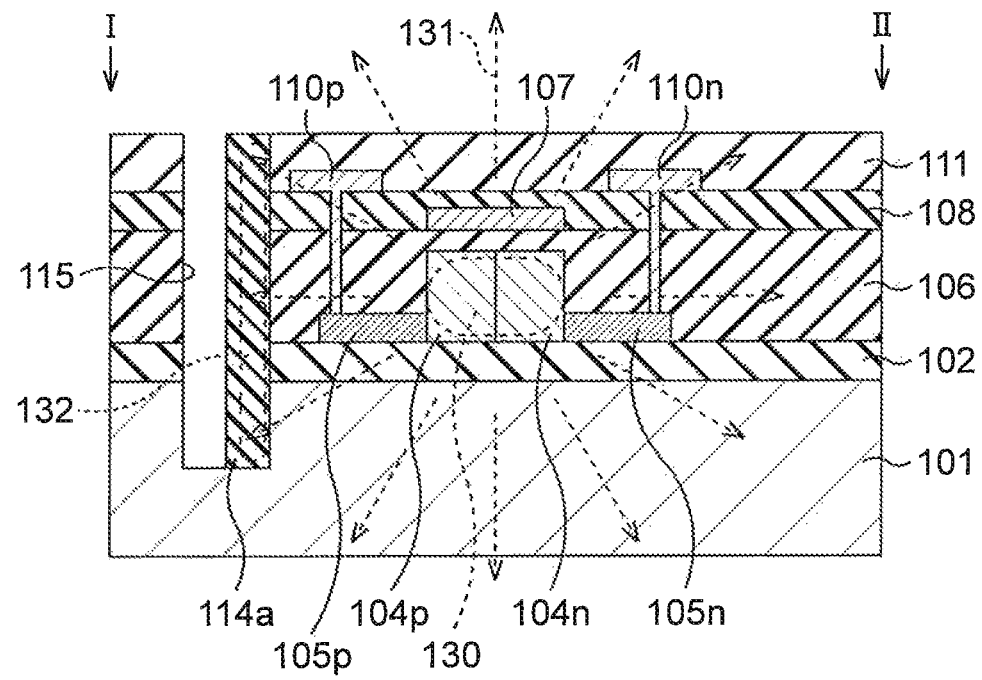
FIG. 10B is a sectional view along a I-II line in FIG. 10A.
Figure 10C:
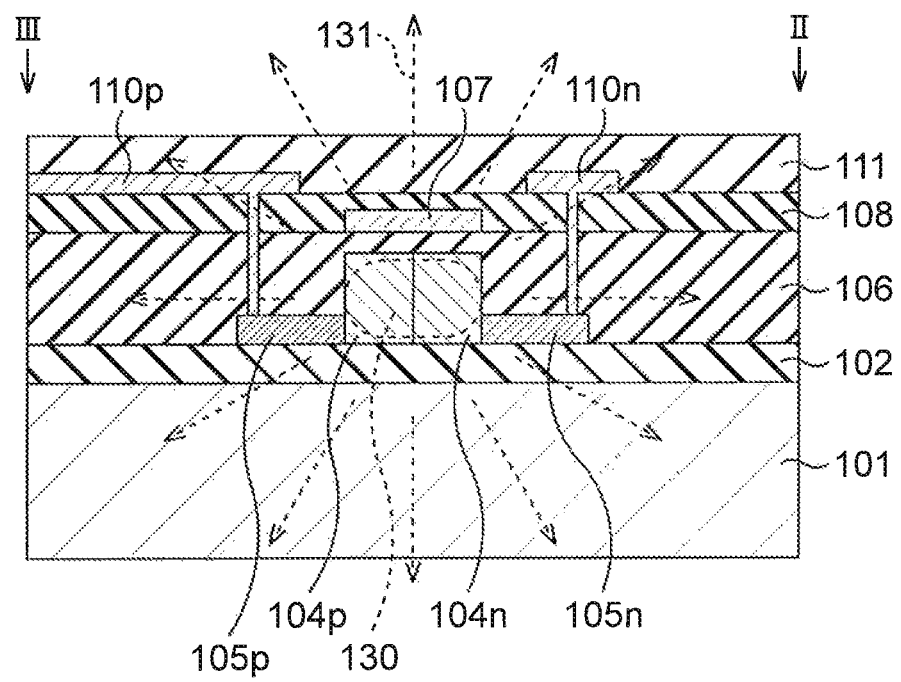
FIG. 10C is a sectional along a III-II line in FIG. 10A.

In the second embodiment, as illustrated in FIG. 10B and FIG. 10C, an $SiO_2$ film 102 is formed on an Si substrate 101. As illustrated in FIG. 10A to FIG. 10C, an $n^+$ layer 105n, an $n^-$ layer 104n, a $p^-$ layer 104p and a $p^+$ layer 105p each in a ring shape are formed in this sequence arranged from inside on the $SiO_2$ film 102. For example, impurity doped Si is used for each of the $n^+$ layer 105n, the $n^-$ layer 104n, the $p^-$ layer 104p and the $p^+$ layer 105p. An $SiO_2$ film 106 covering the $n^+$ layer 105n, the $n^-$ layer 104n, the $p^-$ layer 104p and the $p^+$ layer 105p is formed on the $SiO_2$ film 102, and a ring-shaped heater 107 is formed above the $n^-$ layer 104n and the $p^-$ layer 104p on the $SiO_2$ film 106. The $SiO_2$ film 106 functions as a cladding layer. An $SiO_2$ film 108 covering the heater 107 is formed on the $SiO_2$ film 106. A hole reaching the $n^+$ layer 105n and a hole reaching the $p^+$ layer 105p are formed in the $SiO_2$ film 108 and the $SiO_2$ film 106. A modulating electrode 110n connected to the $n^+$ layer 105n through the hole reaching the $n^+$ layer 105n, and a modulating electrode 110p connected to the $p^+$ layer 105p through the hole reaching the $p^+$ layer 105p are formed on the $SiO_2$ film 108. An $SiO_2$ film 111 covering the modulating electrodes 110n and 110p is formed on the $SiO_2$ film 108. A ring waveguide may be composed as stated above. Note that in FIG. 10A, the $SiO_2$ films 102, 106, 108 and 111 are represented as an $SiO_2$ film 125 as a whole.

A straight waveguide 121 where the light comes and goes to/from the ring waveguide is formed in the vicinity of the ring waveguide. A nearly ring-shaped state light absorbing material 114a is provided at a periphery of the ring waveguide apart from a path of a light between the ring waveguide and the waveguide 121. The light absorbing material 114a is formed from a position below a surface of the Si substrate 101 to reach a surface of the $SiO_2$ film 111. A groove 115 is formed at a periphery of the light absorbing material 114a, and a groove 122 is formed on the opposite side of the waveguide 121 from the ring waveguide.

Two electrodes 124 making a current flow in the heater 107 are provided. A predetermined voltage is applied between the two electrodes 124, and thereby, the current flows in the heater 107, and Joule heat is generated. For example, Ti is used for the heater 107. W, Pt, or doped Si may be used for the heater 107. A material is not limited to the above as long as it is a material capable of forming a stable high resistant film. Two electrodes 123 each connected to the modulating electrodes 110n, 110p are also provided.

For example, an ultraviolet (UV) cure polymer or a thermosetting polymer containing a dye absorbing an incident light wavelength is used for the light absorbing material 114a. A single crystal, polycrystal, or amorphous Si or Ge may be used for the light absorbing material 114a, and one in which light absorption is enhanced by high concentration doping thereto may be used. The material is not limited thereto as long as it is a material having a strong absorptivity for the modulated light wavelength.

In the optical semiconductor element constituted as stated above, a size of a depletion region of a pn junction between the $n^-$ layer 104n and the $p^-$ layer 104p of the ring waveguide changes in accordance with the modulation voltage V, and a modulation of a refractive index of a waveguide mode 130 is enabled according to this change. A light 131 leaks out of the ring waveguide, but a part thereof is absorbed by the light absorbing material 114a, a heat generation 132 occurs at the light absorbing material 114a absorbing the light, and the temperature of the ring waveguide is increased. Accordingly, it is possible to lock the ring resonant wavelength by heating the ring waveguide with the heater 107 before the modulation operation is started to thereby make the ring resonant wavelength higher than a wavelength similar to the intersection 22 in the first embodiment, and thereafter, the heating with the heater 107 is stopped.

Accordingly, it is possible to enable a stable control. Furthermore, it is not necessary to continue to operate the heater 107, and therefore, it is possible to suppress the power consumption low.

The grooves 115 and 122 are formed, and therefore, a heat resistance of the grooves 115, 122 with outside increases to thereby reduce the heat loss. It is thereby possible to effectively utilize the temperature increase with the heater 108 and the temperature increase by the light absorption for the temperature increase of the ring waveguide.

Third Embodiment

Figure 11A:
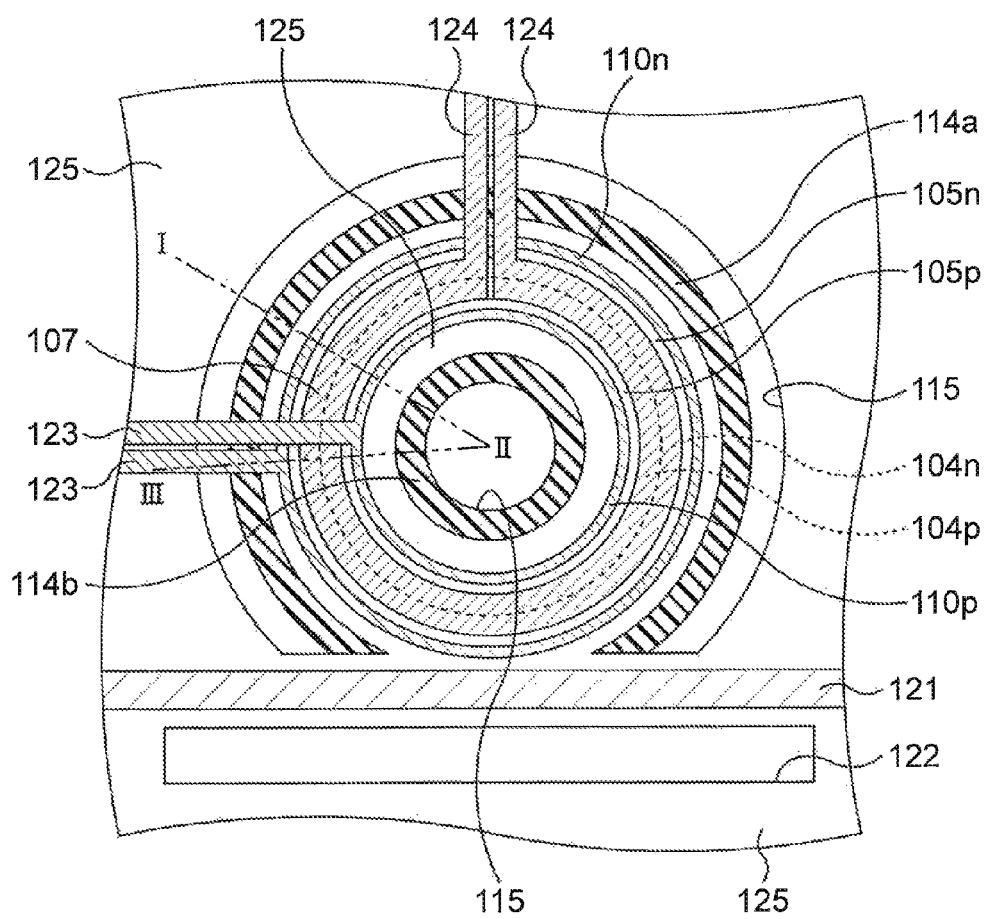
FIG. 11A is a view illustrating a layout of an optical semiconductor element according to a third embodiment.

Next, a third embodiment is described. FIG. 11A is a view illustrating a layout of an optical semiconductor element according to the third embodiment, FIG. 11B is a sectional view along a I-II line in FIG. 11A, and FIG. 11C is a sectional view along a III-II line in FIG. 11A.

Figure 11B:
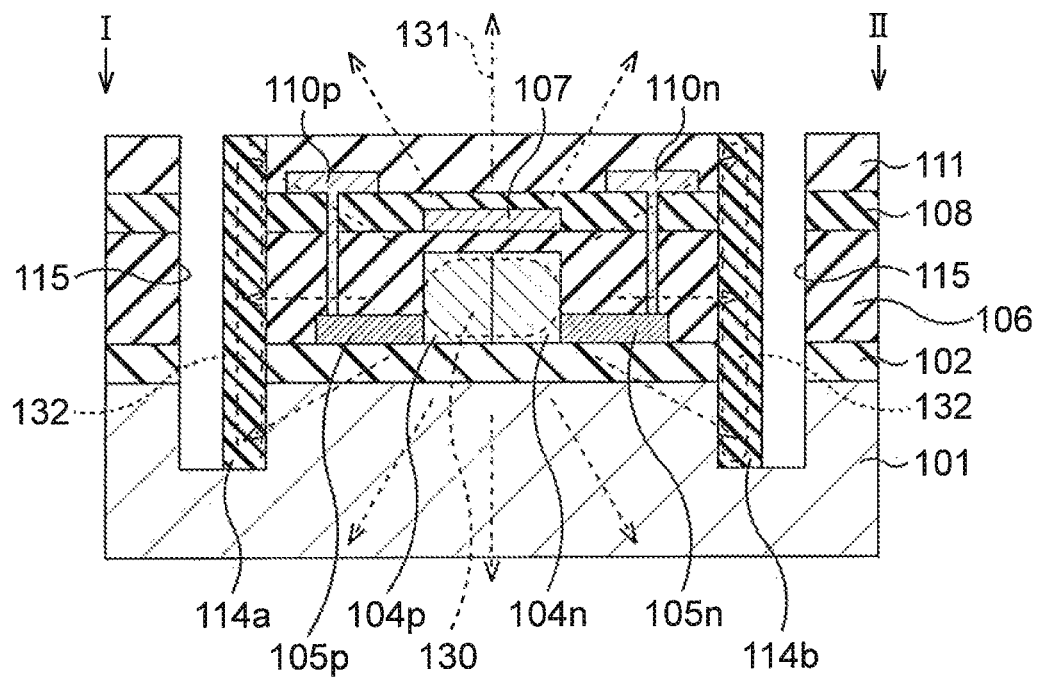
FIG. 11B is a sectional view along a I-II line in FIG. 11A.
Figure 11C:
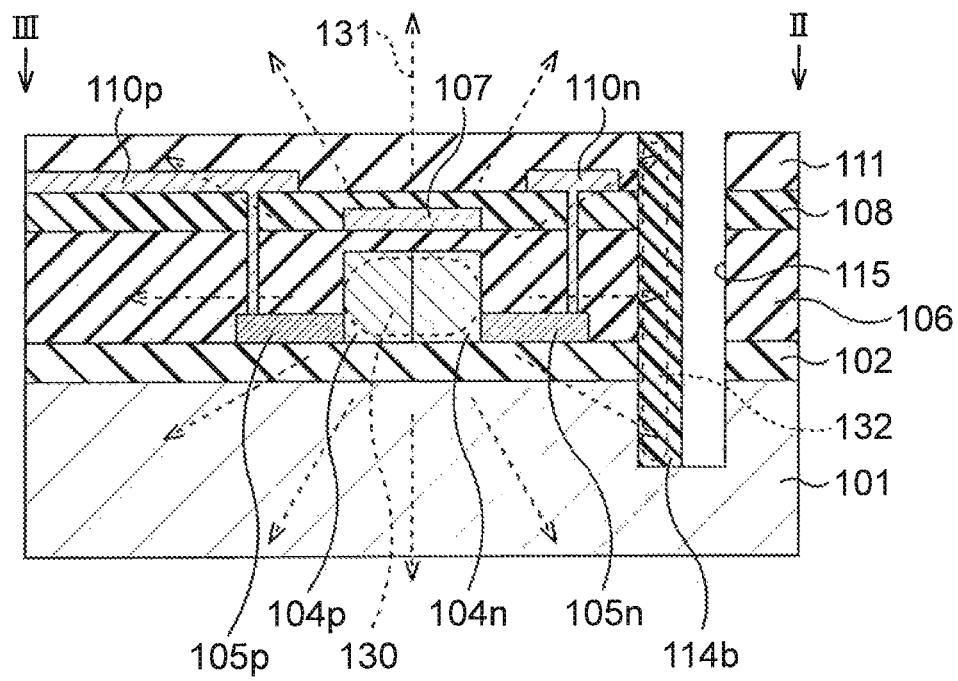
FIG. 11C is a sectional view along a III-II line in FIG. 11A.

In the third embodiment, as illustrated in FIG. 11A to FIG. 11C, a ring state light absorbing material 114b is provided at inside of the $n^+$ layer 105n, and the groove 115 is provided also at inside of the ring state light absorbing material 114b. The other configuration is similar to the second embodiment.

In the third embodiment as stated above, the absorption of the light 131 and the heat generation 132 occur also in the light absorbing material 114b. Accordingly, it is possible to use the heat more efficiently than the second embodiment.

Note that the light absorbing material 114a is not necessarily provided if the light absorbing material 114b is provided.

Fourth Embodiment

Figure 12A:
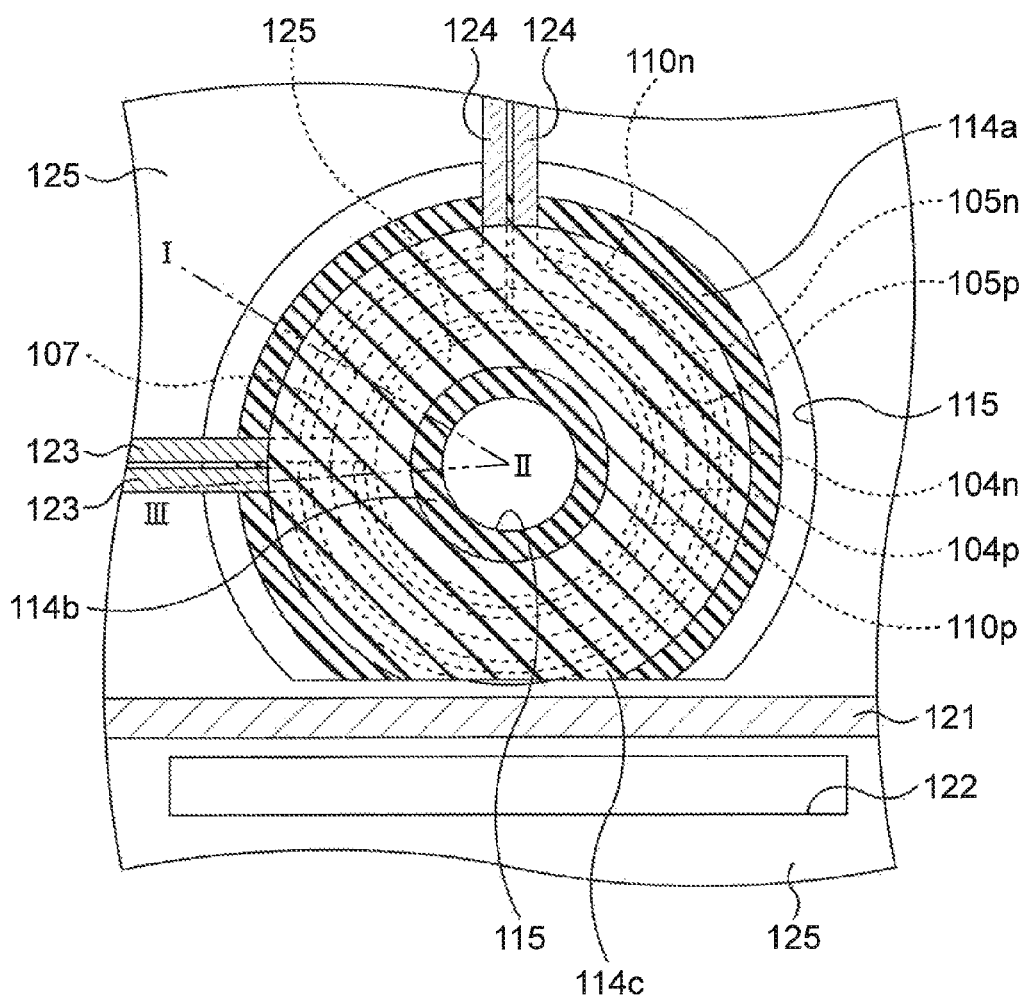
FIG. 12A is a view illustrating a layout of an optical semiconductor element according to a fourth embodiment.

Next, a fourth embodiment is described. FIG. 12A is a view illustrating a layout of an optical semiconductor element according to the fourth embodiment, FIG. 12B is a sectional view along a I-II line in FIG. 12A, and FIG. 12C is a sectional view along a III-II line in FIG. 12A.

Figure 12B:
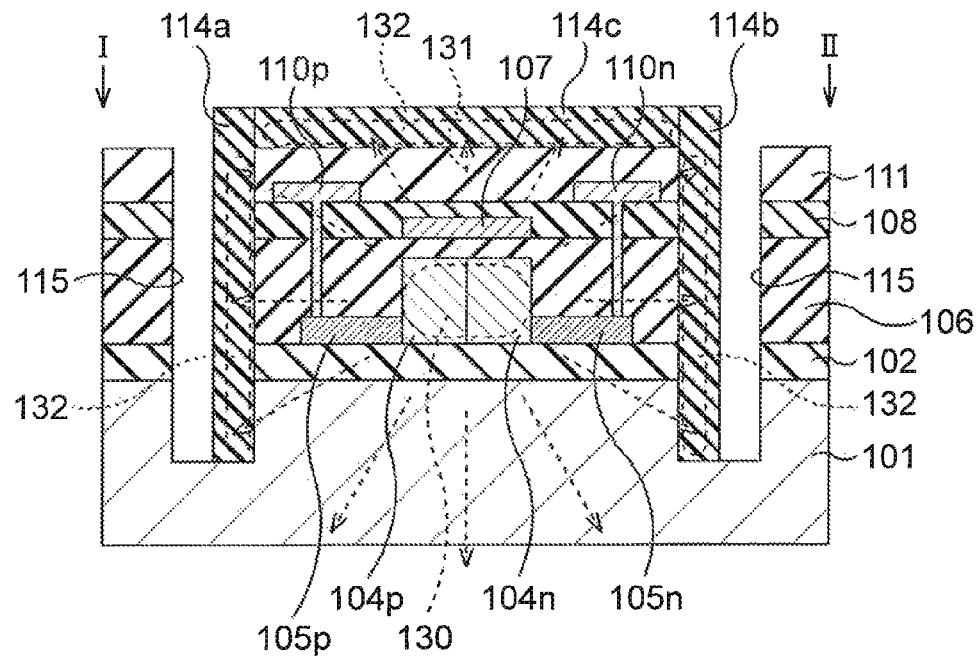
FIG. 12B is a sectional view along a I-II line in FIG. 12A.
Figure 12C:
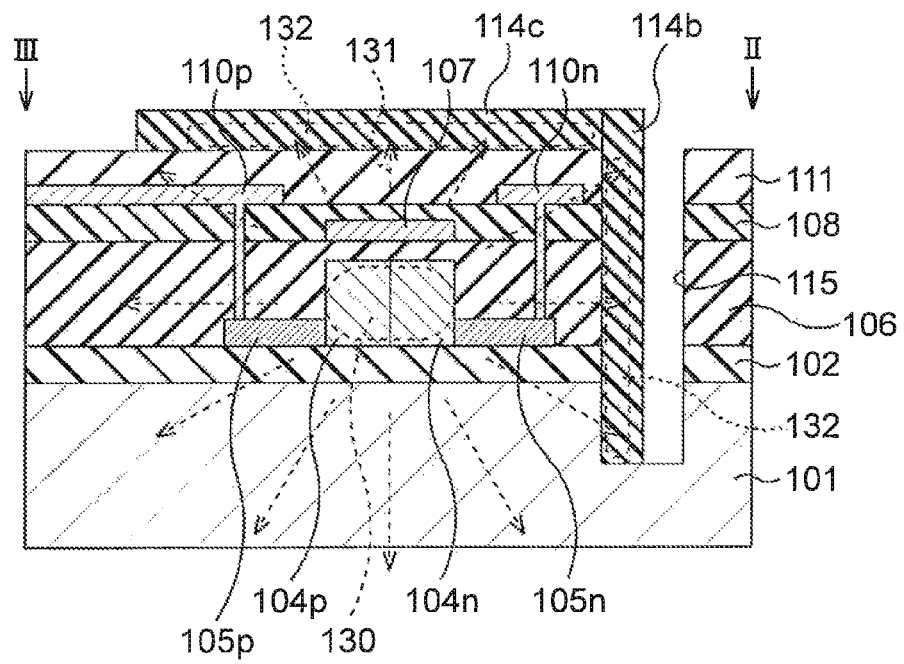
FIG. 12C is a sectional view along a III-II line in FIG. 12A.

In the fourth embodiment, as illustrated in FIG. 12A to FIG. 12C, a ring state light absorbing material 114c is formed on the $SiO_2$ film 111 so as to connect the light absorbing materials 114a and 114b. Accordingly, almost all of the ring waveguide is covered from above with the light absorbing material 114c. The other configuration is similar to the third embodiment.

In the fourth embodiment as stated above, the absorption of the light 131 and the heat generation 132 occur also in the light absorbing material 114c. Accordingly, it is possible to use the heat further more efficiently than the third embodiment.

Note that one of or both of the light absorbing materials 114a and 114b is/are not necessarily provided if the light absorbing material 114c is provided.

Fifth Embodiment

Figure 13B:
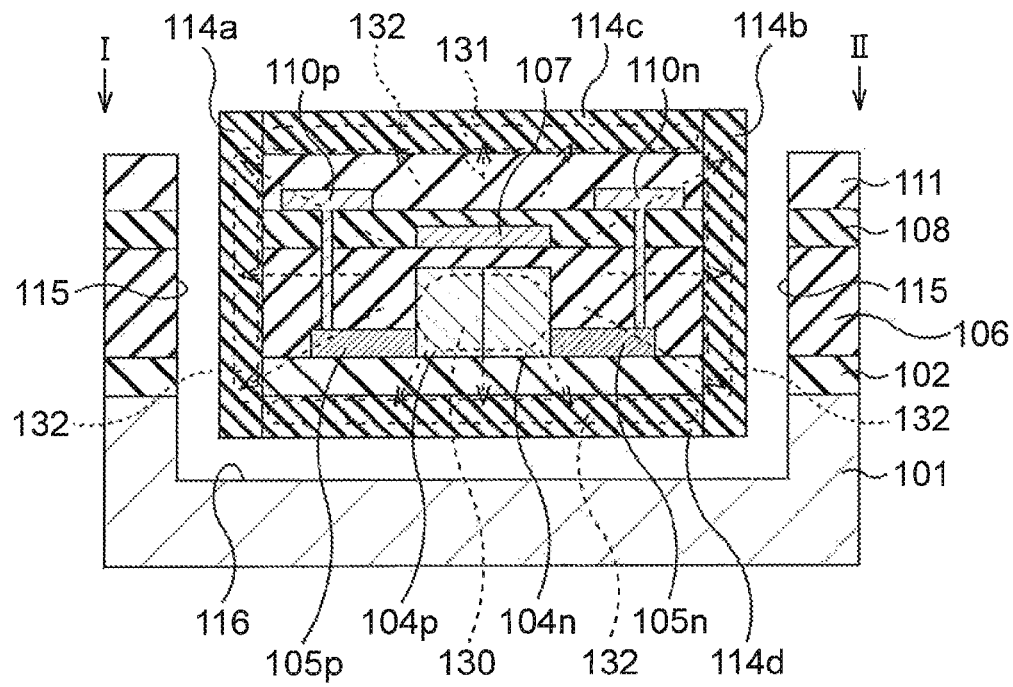
FIG. 13B is a sectional view along a I-II line in FIG. 13A.

Next, a fifth embodiment is described. FIG. 13A is a view illustrating a layout of an optical semiconductor element according to the fifth embodiment, FIG. 13B is a sectional view along a I-II line in FIG. 13A, and FIG. 13C is a sectional view along a III-II line in FIG. 13A.

Figure 13C:
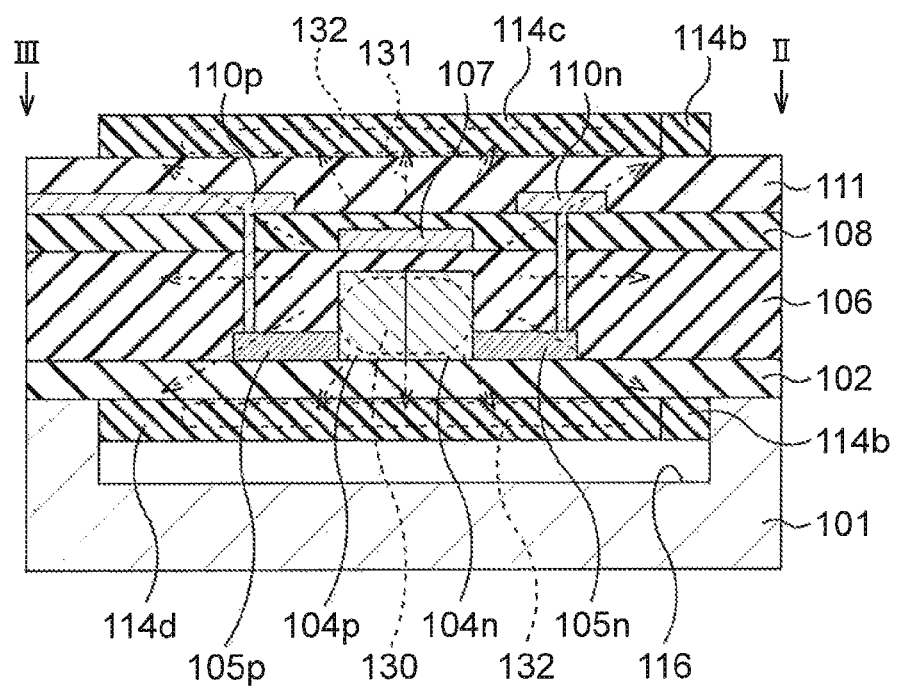
FIG. 13C is a sectional view along a III-II line in FIG. 13A.

In the fifth embodiment, as illustrated in FIG. 13A to FIG. 13C, a ring state light absorbing material 114d is formed under the $SiO_2$ film 102 so as to connect the light absorbing materials 114a and 114b. Accordingly, almost all of the ring waveguide is covered from underneath with the light absorbing material 114d. A hollow part 116 exists under the light absorbing material 114d. The other configuration is similar to the fourth embodiment.

In the fifth embodiment as stated above, the absorption of the light 131 and the heat generation 132 occur also in the light absorbing material 114d. In the fifth embodiment, almost all of the ring waveguide is surrounded by the light absorbing materials 114a, 114b, 114c and 114d from all directions. Accordingly, it is possible to further more efficiently use the heat than the fourth embodiment, and the heat loss seldom occurs. Further, the existence of the hollow part 116 largely contributes to the reduction of the heat loss.

Note that the light absorbing materials 114a, 114b or 114c or any combination thereof is/are not necessarily provided if the light absorbing material 114d is provided.

Sixth Embodiment

Figure 14A:
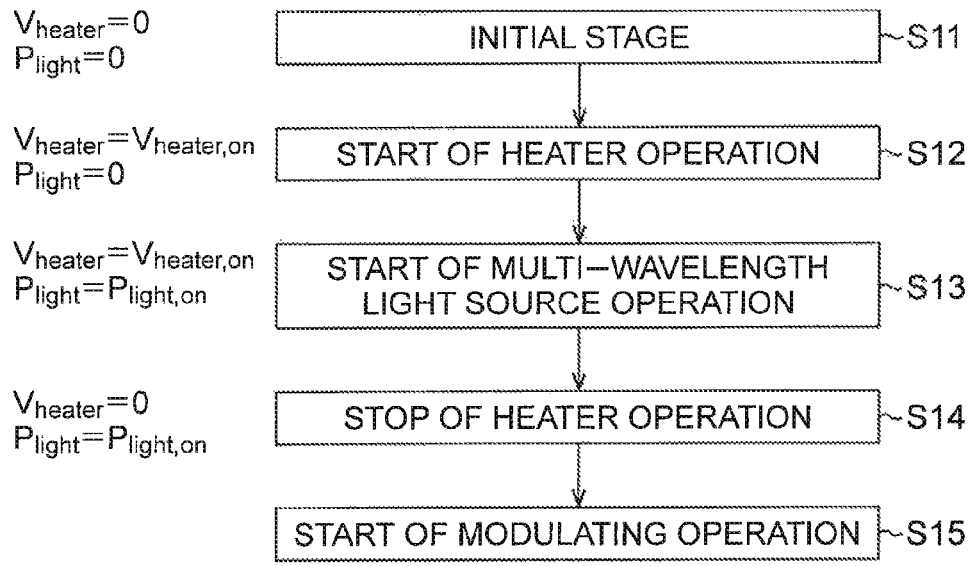
FIG. 14A is a flowchart illustrating an example of a method of controlling an optical semiconductor element according to a sixth embodiment.

Next, a sixth embodiment is described. The sixth embodiment relates to a method of controlling the optical semiconductor elements according to the first to fifth embodiments. FIG. 14A is a flowchart illustrating an example of a method of controlling the optical semiconductor element according to the sixth embodiment, and FIG. 14B is a flowchart illustrating another example.

In the method illustrated in FIG. 14A, the heater 107 is operated (step S12) from an initial stage (step S11). Then, the multi-wavelength light source is also operated (step S13), and thereafter, the operation of the heater 107 is stopped (step S14) by stopping the application of the voltage to the heater 107. Then the modulation operation is started (step S15).

Figure 14B:
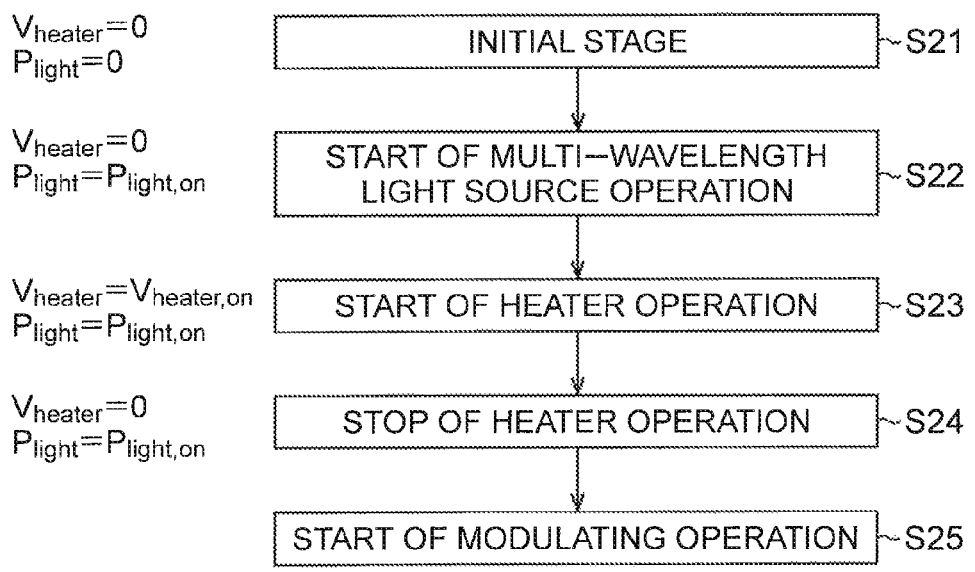
FIG. 14B is a flowchart illustrating another example of a method of controlling an optical semiconductor element according to the sixth embodiment.

In the method illustrated in FIG. 14B, the Multi-wavelength light source is operated (step S22) from an initial stage (step S21). Then, the heater 107 is also operated (step S23), and thereafter, the operation of the heater 107 is stopped (step S24) by stopping the application of the voltage to the heater 107. Then the modulation operation is started (step S25.

The controls as stated above are performed, and thereby, it is possible to lock the ring resonant wavelength according to any of the examples.

Note that a ring resonant wavelength at an initial stage is set to be a wavelength shorter than the modulated light wavelength. Namely, a ring resonant wavelength at an initial stage may vary depending on manufacturing accuracy and a temperature, and therefore, a ring resonant wavelength at an initial stage is set so that the ring resonant wavelength is shorter than the modulated light wavelength even in a case where the ring resonant wavelength at the initial stage varies on the longest wavelength side. Besides, a voltage $V_{heater\ on}$ of the heater 107 during the operation is set so that the ring resonant wavelength during the operation is longer than the modulated light wavelength even in a case where the ring resonant wavelength at the initial stage varies on the shortest wavelength side.

Seventh Embodiment

Figure 15A:
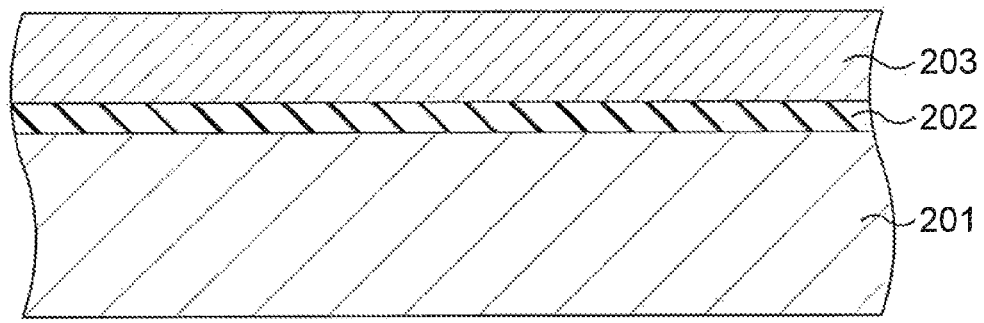
FIG. 15A to FIG. 15P are sectional views illustrating a method of manufacturing an optical semiconductor element according to a seventh embodiment in process sequence.
Figure 15B:
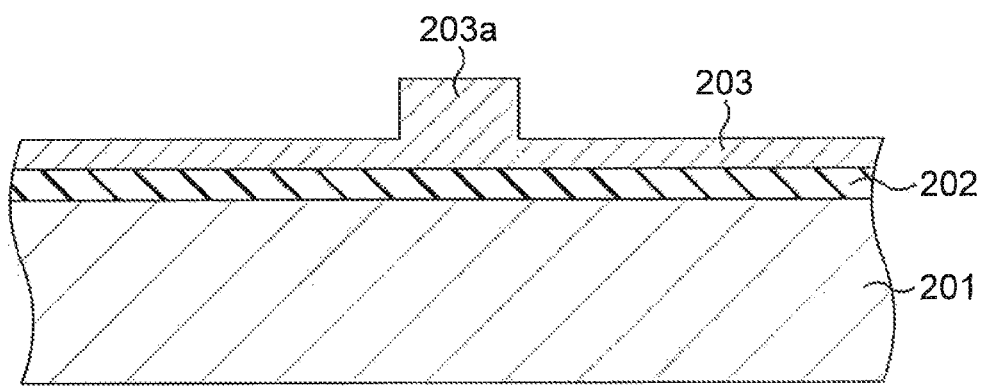
Figure 15C:
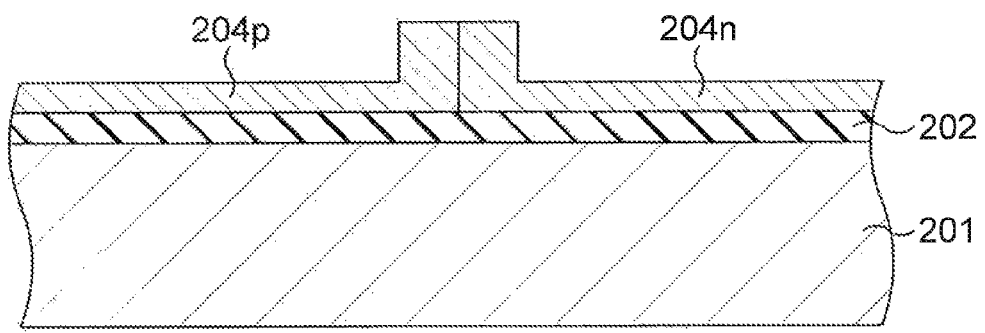
Figure 15D:
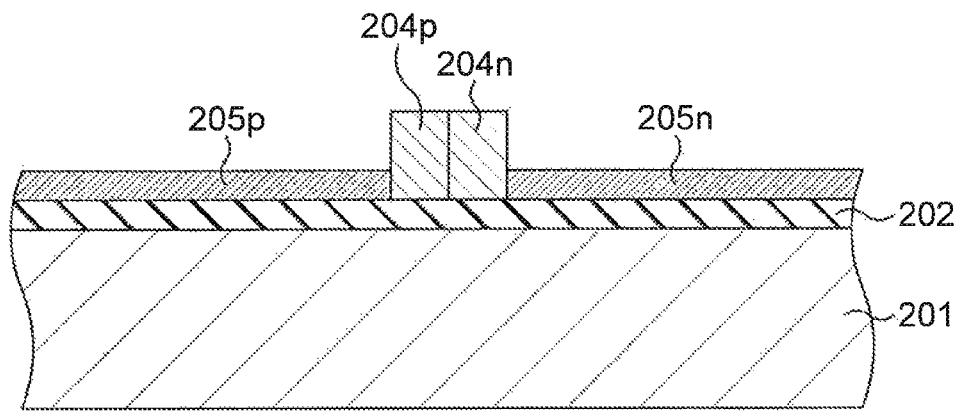
Figure 15E:
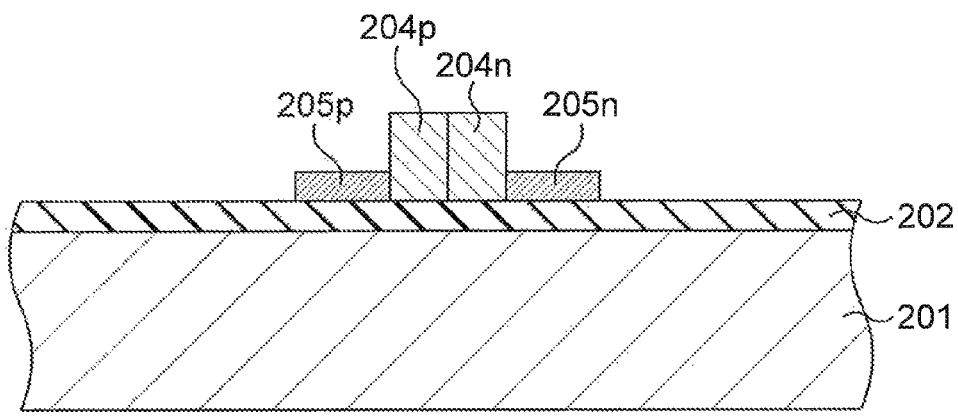

Next, a seventh embodiment is described. The seventh embodiment relates to a method of manufacturing an optical semiconductor element similar to the fifth embodiment. FIG. 15A to FIG. 15P are sectional views illustrating the method of manufacturing the optical semiconductor element according to the seventh embodiment in process sequence.

First, as illustrated in FIG. 15A, an $SiO_2$ film 202 is formed on an Si substrate 201, and an Si film 203 is formed thereon. Then, as illustrated in FIG. 15B, a mesa part 203a is formed at the Si film 203 by etching the Si film 203 at a periphery of a region where an $n^+$ layer is to be formed and a region where a $p^+$ layer is to be formed. Thereafter, an $n^-$ layer 204n is formed by doping an n-type impurity at low concentration into the region where the $n^+$ layer is to be formed and a region where an $n^-$ layer is to be formed, and a $p^-$ layer 204p is formed by doping a p-type impurity at low concentration into the region where the $p^+$ layer is to be formed and a region where a $p^-$ layer is to be formed. Either of the $n^-$ layer 204n or the a $p^-$ layer 204p may be formed first. Subsequently, as illustrated in FIG. 15D, an $n^+$ layer 205n is formed by further doping an n-type impurity into the region where the $n^+$ layer is to be formed, and a $p^+$ layer 205p is formed by further doping a p-type impurity into the region where the $p^+$ layer is to be formed. Either of the $n^+$ layer 205n or the $p^+$ layer 205p may be formed first. Then, as illustrated in FIG. 15E, a part of the $n^+$ layer 205n and a part of the $p^+$ layer 205p is etched so as to remain the $n^+$ layer 205n and the $p^+$ layer 205p at a region where the ring waveguide is to be formed.

Figure 15F:
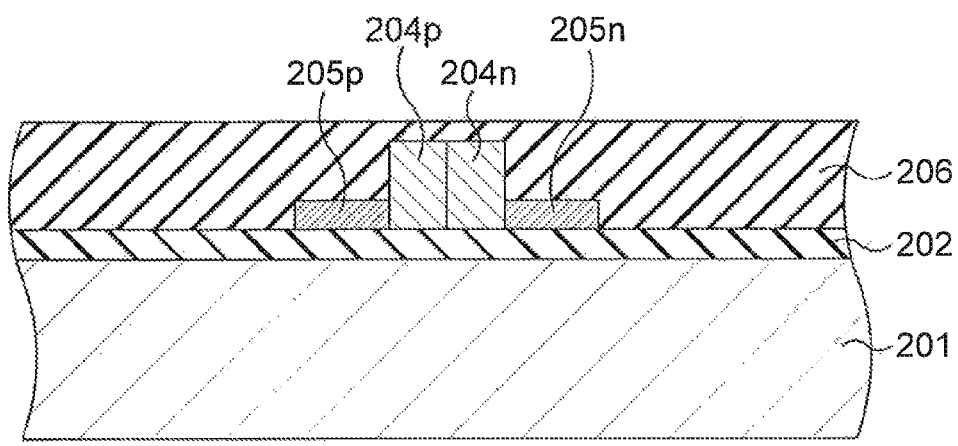
Figure 15G:
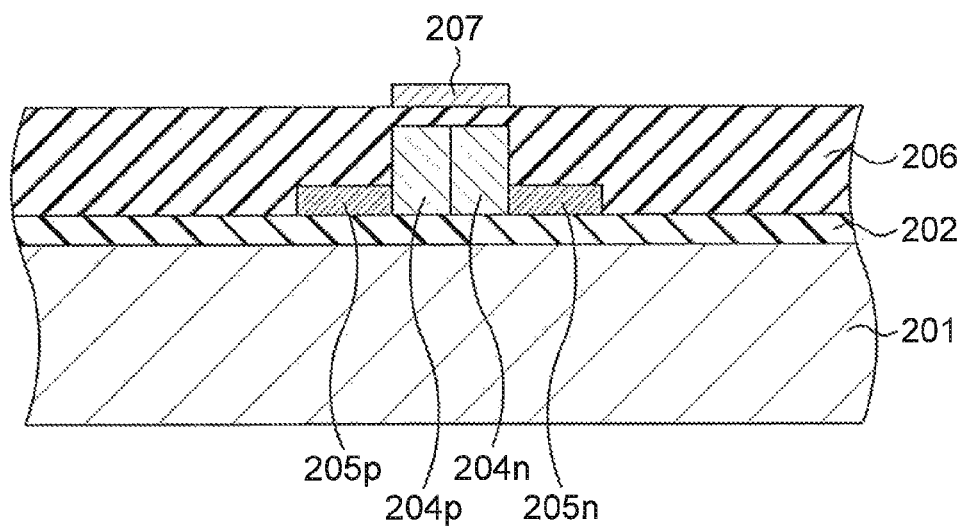
Figure 15H:
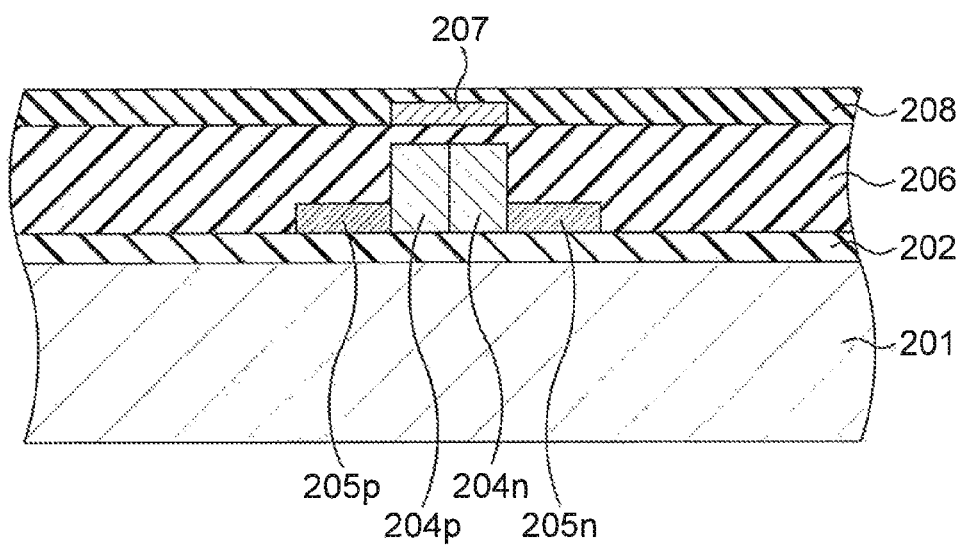

Thereafter, as illustrated in FIG. 15F, an $SiO_2$ film 206 covering the $n^+$ layer 205n, the $n^-$ layer 204n, the $p^-$ layer 204p and the $p^+$ layer 205p is formed on the $SiO_2$ film 202. The $SiO_2$ film 206 functions as a cladding layer. Subsequently, as illustrated in FIG. 15G, a ring state heater 207 is formed at a position above the $n^-$ layer 204n and the $p^-$ layer 204p on the $SiO_2$ film 206. Then, as illustrated in FIG. 15H, an $SiO_2$ film 208 covering the heater 207 is formed on the $SiO_2$ film 206.

Figure 15I:
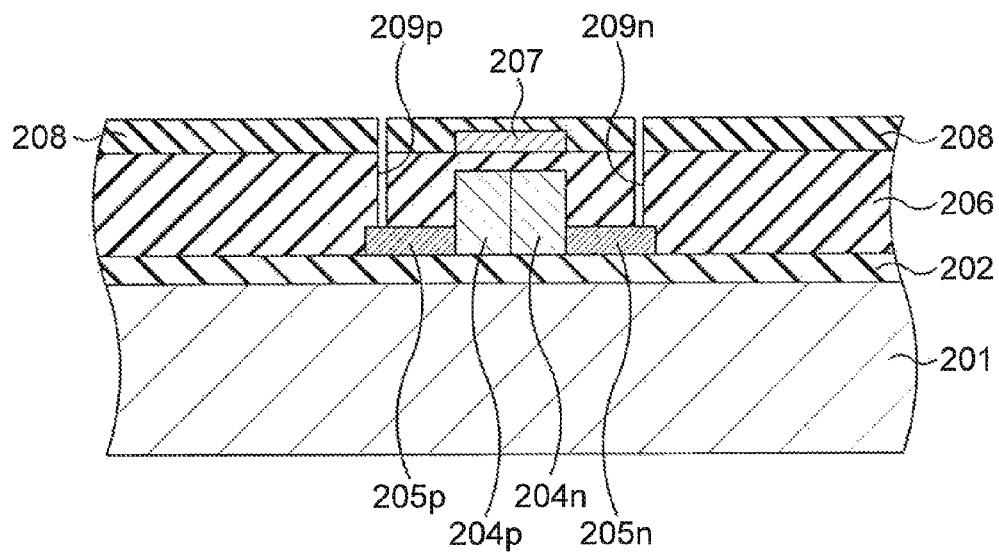
Figure 15J:
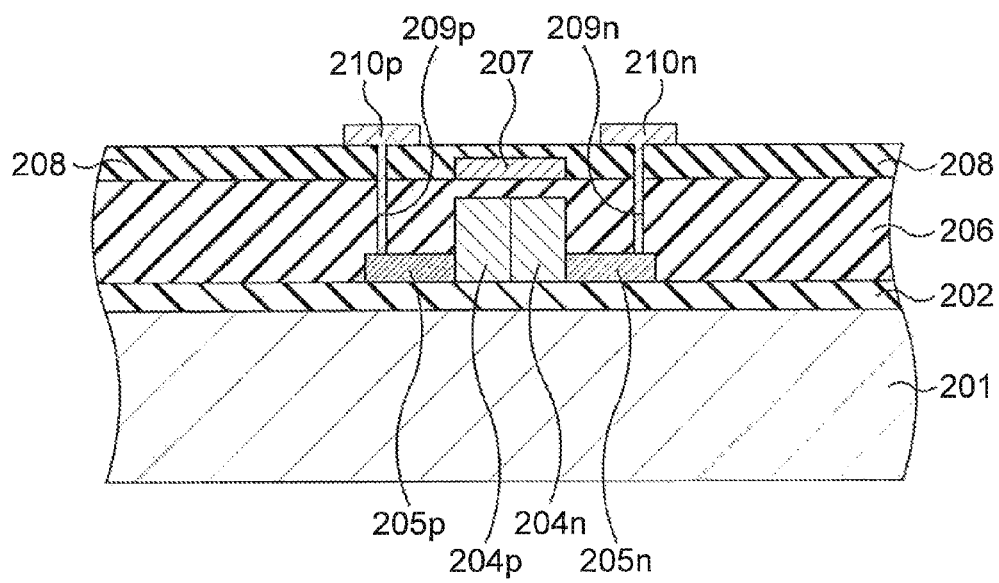
Figure 15K:
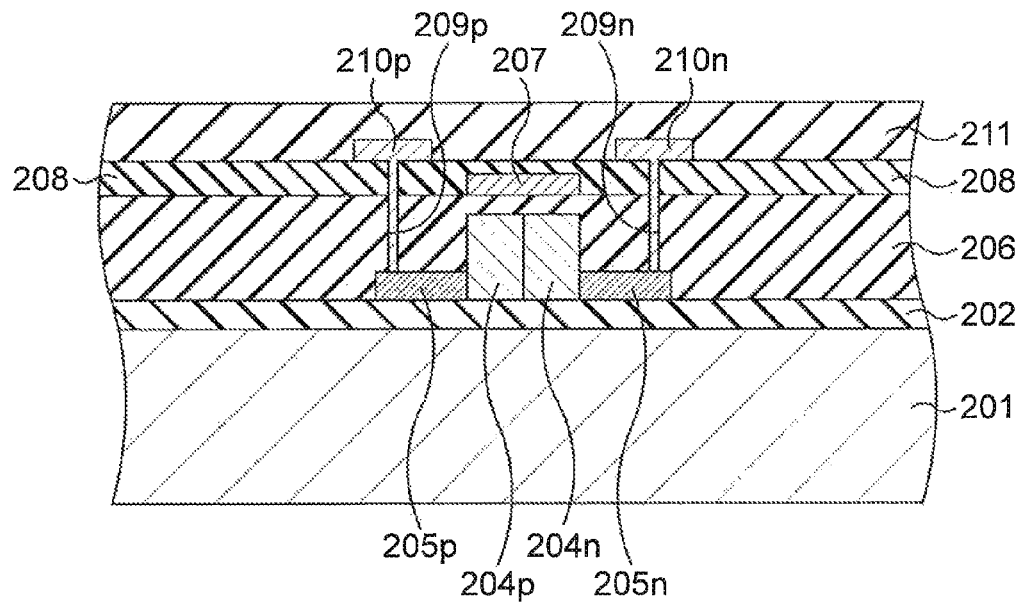

Thereafter, as illustrated in FIG. 15I, a hole 209n reaching the $n^+$ layer 205n and a hole 209p reaching the $p^+$ layer 205p are formed in the $SiO_2$ film 208 and the $SiO_2$ film 206. Subsequently, as illustrated in FIG. 15J, a modulating electrode 210n connected to the $n^+$ layer 205n through the hole 209n and a modulating electrode 210p connected to the $p^+$ layer 205p through the hole 209p are formed on the $SiO_2$ film 208. Then, as illustrated in FIG. 15K, an $SiO_2$ film 211 covering the modulating electrode 210n and the modulating electrode 210p is formed on the $SiO_2$ film 208.

Figure 15L:
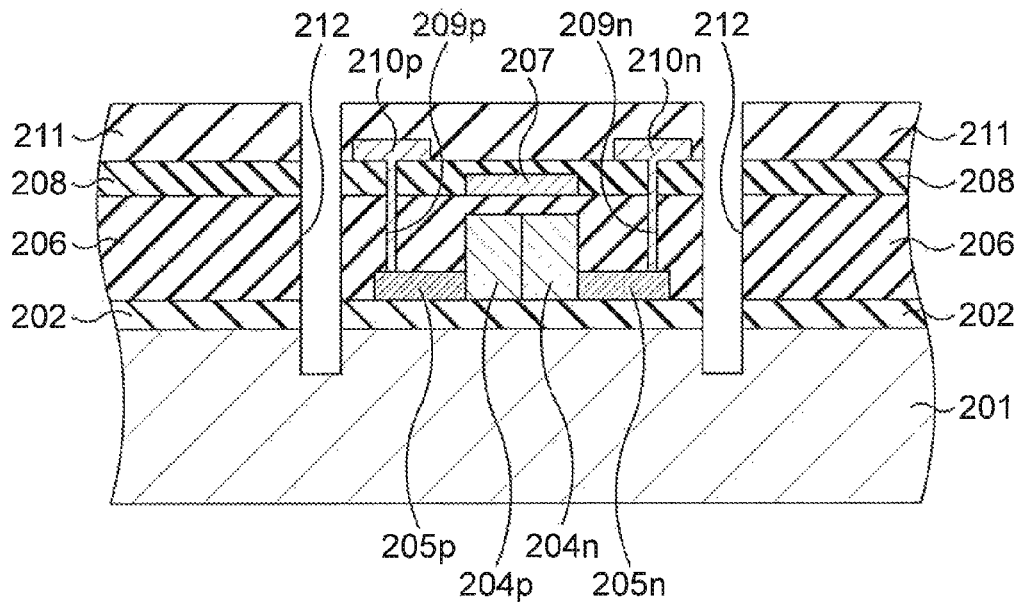
Figure 15M:
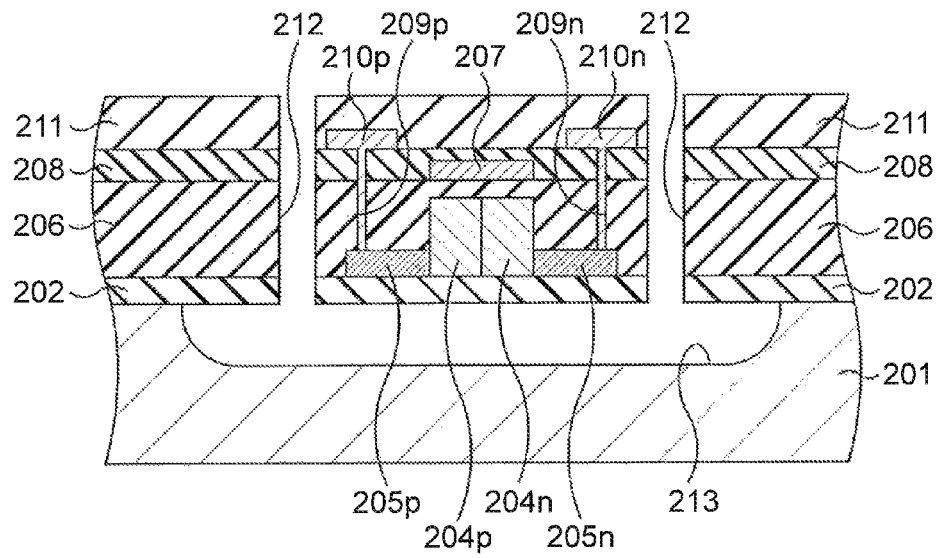
Figure 15N:
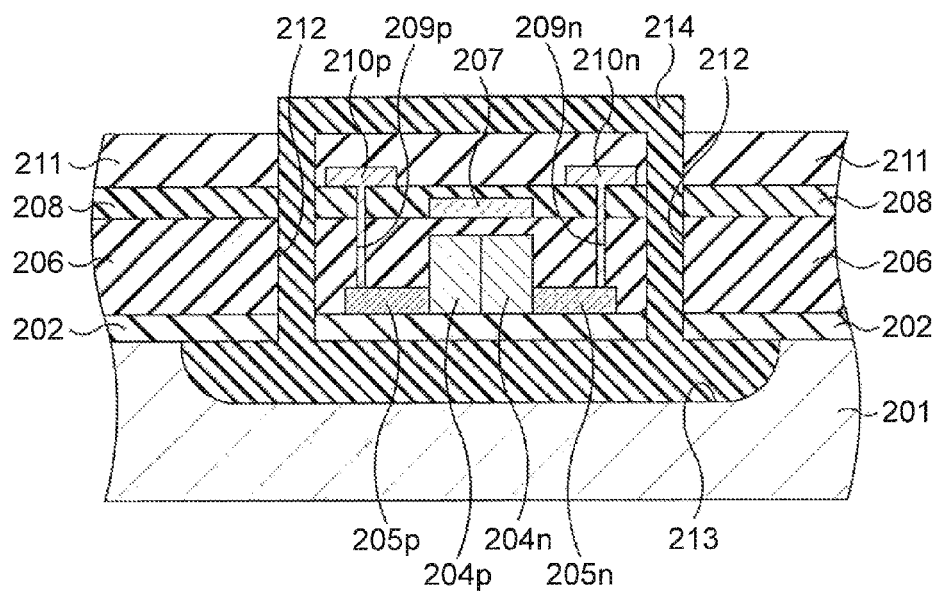

Thereafter, as illustrated in FIG. 15L, grooves 212 are formed at regions where light absorbing materials are to be formed, namely, at inside and outside of the ring waveguide. A depth of the groove 212 is set to be, for example, a degree reaching inside of the Si substrate 201. Subsequently, as illustrated in FIG. 15M, a hollow part 213 connecting the grooves 212 with each other is formed by isotropic etching a surface layer part of the Si substrate 201 through the grooves 212. Then, as illustrated in FIG. 15N, a light absorbing material 214 is formed inside of the hollow part 213 and inside of the grooves 212. At this time, the light absorbing material 214 is formed to connect the grooves 212 with each other also above the $SiO_2$ film 211.

Figure 15O:
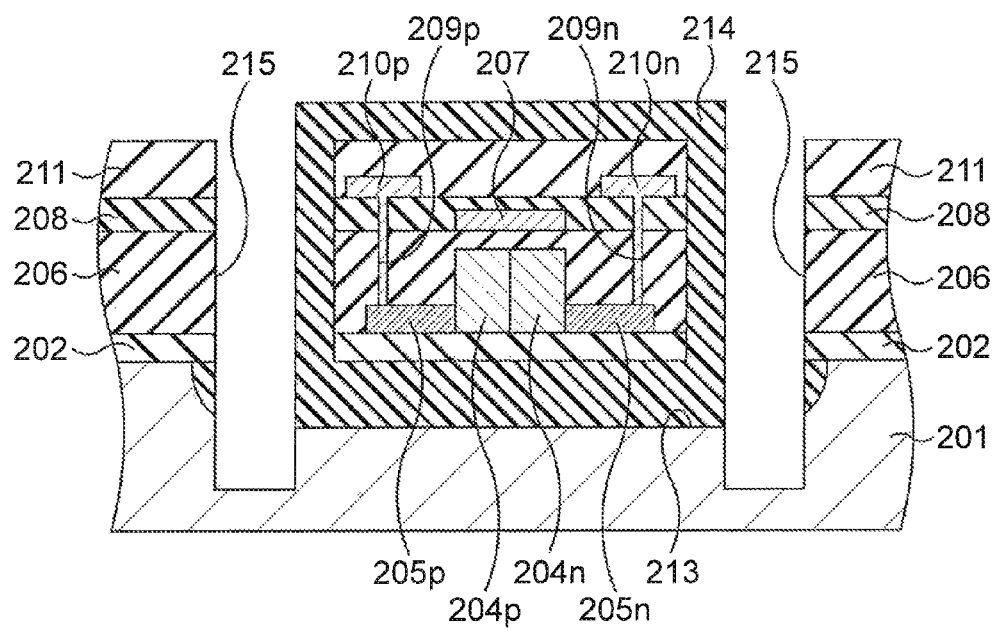
Figure 15P:
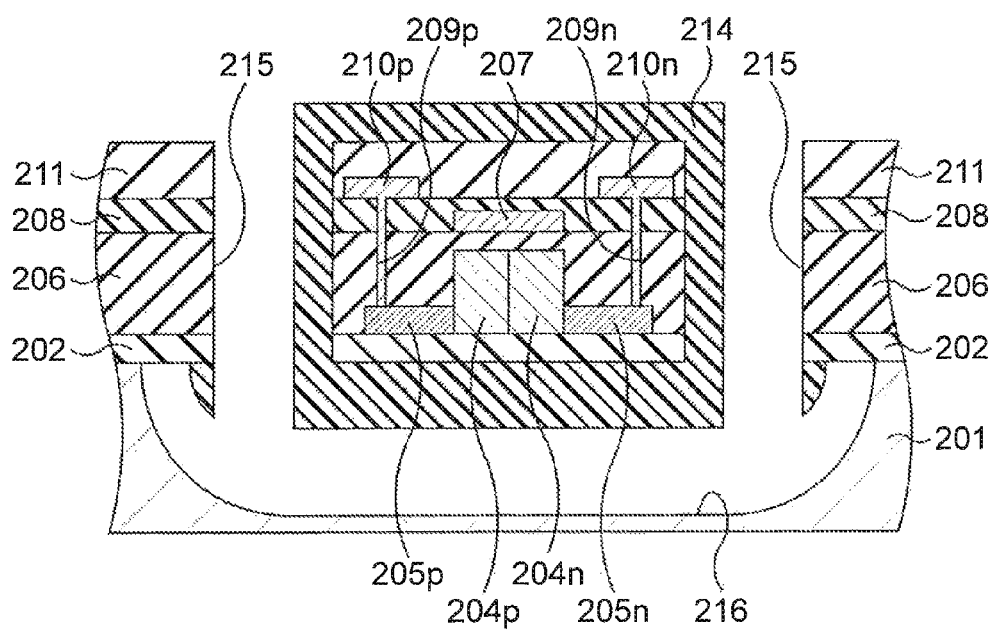

Thereafter, as illustrated in FIG. 15O, grooves 215 are formed on both sides of the light absorbing material 214. At this time, a position of a bottom of the groove 215 is set to be deeper than a bottom of the light absorbing material 214. Subsequently, as illustrated in FIG. 15P, a hollow part 216 connecting the grooves 215 with each other is formed by isotropic etching the surface layer part of the Si substrate 201 through the grooves 215.

Thus, the optical semiconductor element similar to the fifth embodiment may be manufactured. When an optical semiconductor element similar to the fourth embodiment is manufactured, the formation of the hollow part 213 is omitted so that the light absorbing material 214 does not enter into a lower part of the ring waveguide, and further, the formations of the grooves 215 and the hollow part 216 are omitted. When an optical semiconductor element similar to the third embodiment is manufactured, further, the light absorbing material 214 is not to be formed on the $SiO_2$ film 211. For example, a mask may be formed in advance. When an optical semiconductor element similar to the second embodiment is manufactured, further, the formation of the groove 212 inside of the ring waveguide is omitted, and the groove 212 is formed only outside of the ring waveguide.

Eighth Embodiment

Next, an eighth embodiment is described. FIG. 16A is a view illustrating a structure of an optical semiconductor element according to the eighth embodiment.

Figure 16B:
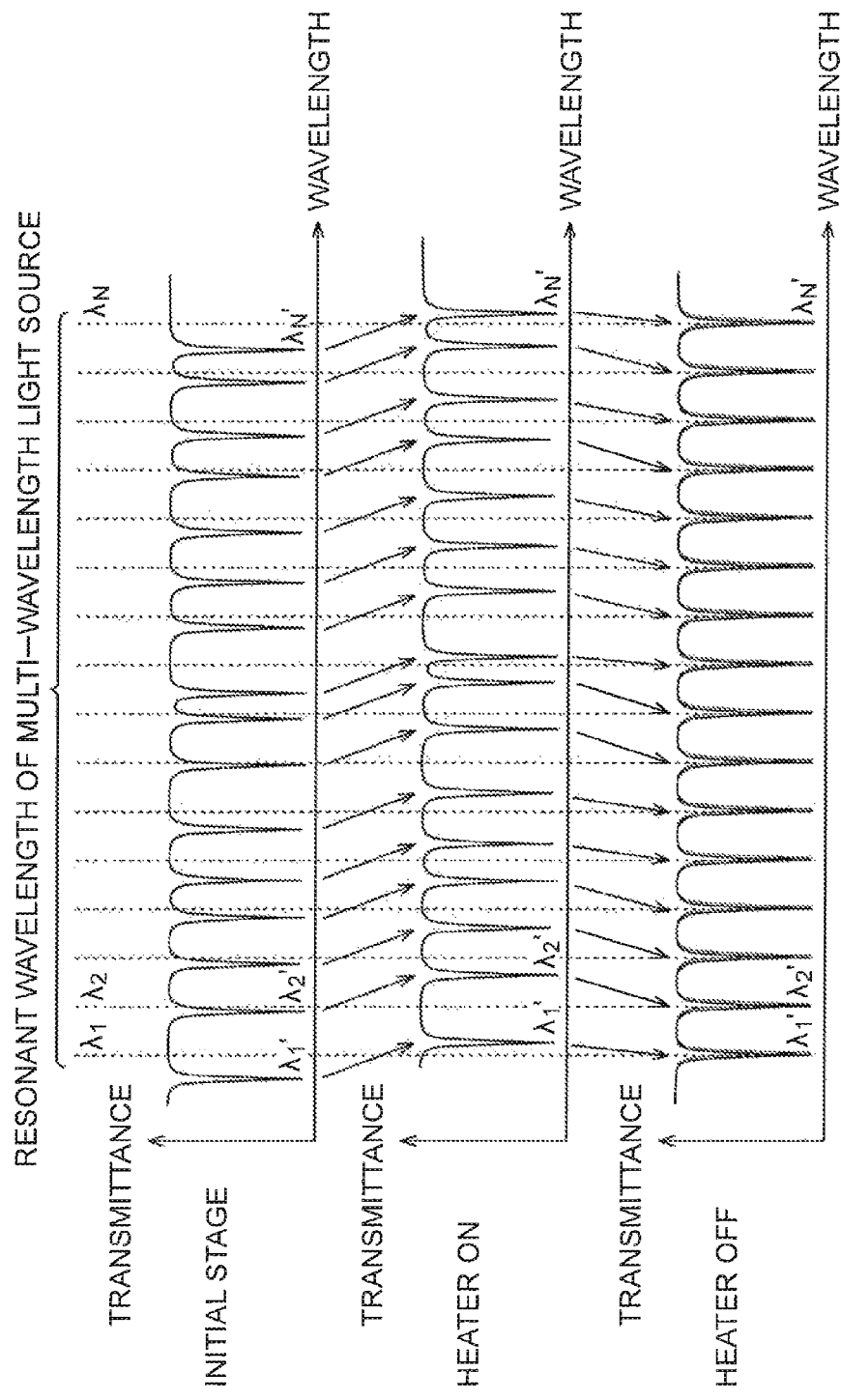
FIG. 16B is a view illustrating operations of the optical semiconductor element according to the eighth embodiment.

In the eighth embodiment, as illustrated in FIG. 16A, N-pieces of ring modulators $41_1$ to $41_N$ similar to the fifth embodiment are provided along the waveguide 1. Namely, the N-pieces of ring modulators $41_1$ to $41_N$ are cascade-connected. Ring circumferential optical path lengths of the ring modulators $41_1$ to $41_N$ are different from one another, and as illustrated in FIG. 16B, respective ring resonant wavelengths of the ring modulators $41_1$ to $41_N$ at an initial stage are $\lambda_1', \lambda_2', \ldots, \lambda_N'$. A multi-wavelength light source 42 is connected to an input of the waveguide 1, and a multi-wavelength light having N-kinds of oscillation wavelengths $\lambda_1, \lambda_2, \ldots, \lambda_N$ is input from the multi-wavelength light source 42 to the waveguide 1. Here, as illustrated in FIG. 16B, the oscillation wavelengths $\lambda_1, \lambda_2, \ldots, \lambda_N$ are longer than the ring resonant wavelengths $\lambda_1', \lambda_2', \ldots, \lambda_N'$ respectively at the initial stage. The oscillation wavelengths $\lambda_1, \lambda_2, \ldots, \lambda_N$ and the ring resonant wavelengths $\lambda_1', \lambda_2', \ldots, \lambda_N'$ are set so that the ring resonant wavelengths $\lambda_1', \lambda_2', \ldots, \lambda_N'$ are longer than the oscillation wavelengths $\lambda_1, \lambda_2, \ldots, \lambda_N$ when the respective heaters of the ring modulators $41_1$ to $41_N$ are operated.

When the respective heaters are operated for the eighth embodiment as stated above as same as the sixth embodiment, the ring resonant wavelengths $\lambda_1', \lambda_2', \ldots, \lambda_N'$ become longer than the oscillation wavelengths $\lambda_1, \lambda_2, \ldots, \lambda_N$ as illustrated in FIG. 16B. Once the operation of the respective heaters are stopped under this state as same as the sixth embodiment, the ring resonant wavelengths $\lambda_1', \lambda_2', \ldots, \lambda_N'$ are respectively locked at the wavelengths suitable for the modulation of the oscillation wavelengths $\lambda_1, \lambda_2, \ldots, \lambda_N$ as illustrated in FIG. 16B. It becomes possible to apply the appropriate modulation on this wavelength.

In this embodiment, the ring resonant wavelengths $\lambda_1', \lambda_2', \ldots, \lambda_N'$ of the ring modulators $41_1$ to $41_N$ are set so that, the farther from the input (light source) and the closer to the output, the longer the ring resonant wavelength is, namely, a relationship of "$\lambda_1' < \lambda_2' < \ldots, < \lambda_N'$" is satisfied. A sequence of an order of the ring resonant wavelengths $\lambda_1', \lambda_2', \ldots, \lambda_N'$ is not limited thereto, and the ring modulators $41_1$ to $41_N$ may be arranged in any sequence.

Though the ring modulators $41_1$ to $41_N$ similar to the fifth embodiment are provided in the present embodiment, the ring modulators $41_1$ to $41_N$ may have structures similar to any one of the first to fourth embodiments. An example of controlling in which the ring resonant wavelength intersects with only one oscillation wavelength during the heater operation is illustrated in FIG. 16B, two or more oscillation wavelengths may be intersected.

Ninth Embodiment

Figure 17:
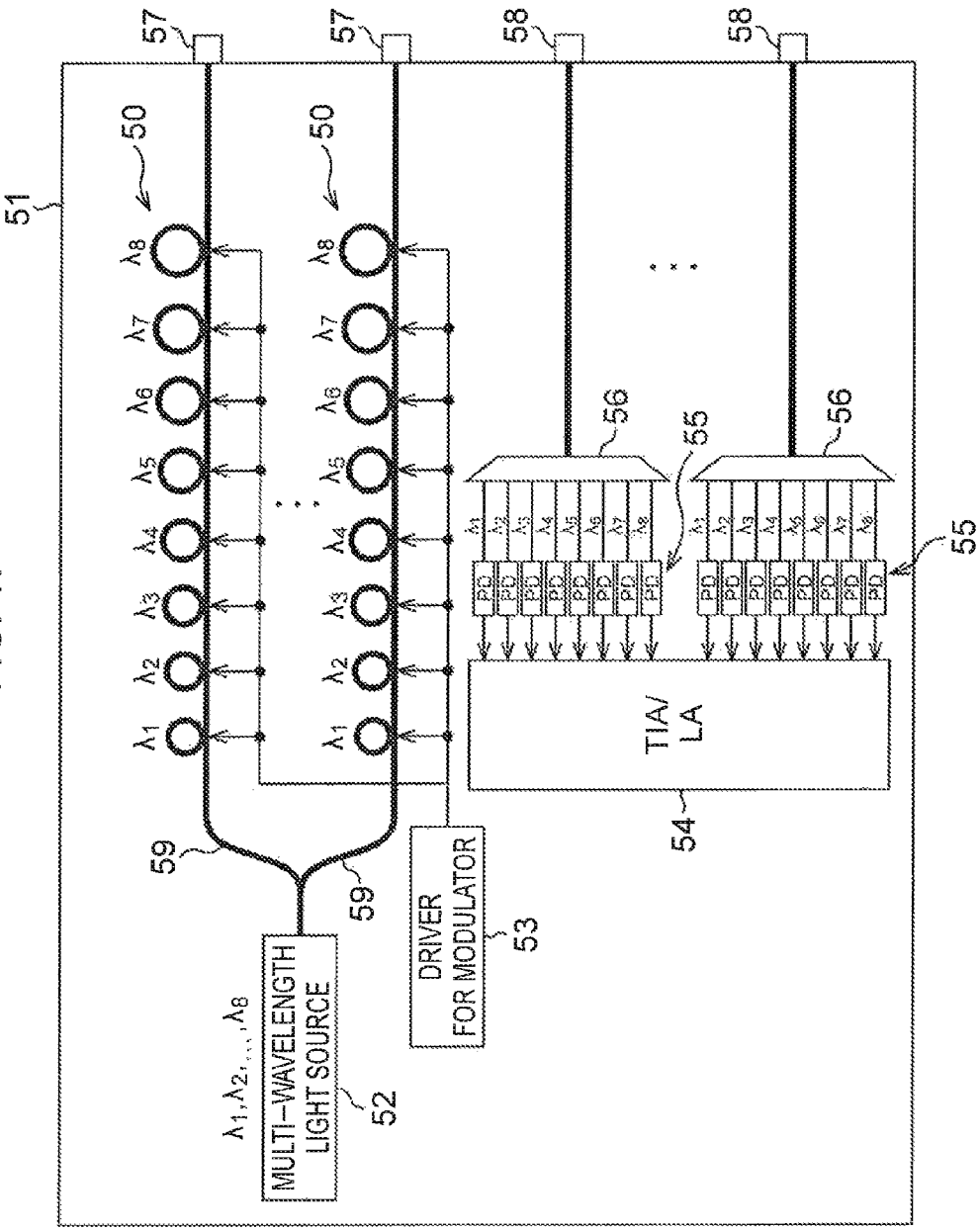
FIG. 17 is a view illustrating an optical semiconductor element according to a ninth embodiment.

Next, a ninth embodiment is described. The ninth embodiment relates to an optical transmitting and receiving device. FIG. 17 is a view illustrating an optical semiconductor element according to the ninth embodiment.

A multi-wavelength light source 52 emitting a multi-wavelength light having eight kinds of oscillation wavelengths $\lambda_1, \lambda_2, \ldots, \lambda_8$ is provided to an optical transmitting and receiving device 51 according the ninth embodiment, and waveguides 59 are connected to the multi-wavelength light source 52. A ring modulation group 50 including eight pieces of ring modulators is provided by each waveguide 59. Ring resonant wavelengths of the eight pieces of ring modulators at an initial stage are $\lambda_1', \lambda_2', \ldots, \lambda_8'$. Further, a driver for modulator 53 controlling modulation of each ring modulator is provided. The driver for modulator 53 controls, for example, a modulation voltage of each ring modulator. An output port 57 is provided at each waveguide 59.

Further, input ports 58 are provided to the optical transmitting and receiving device 51, and for example, a demultiplexer 56 in a wavelength division multiplexing system (WDM) is connected to each input port 58. A photodiode 55 receiving an optical signal output from the demultiplexer 56 is provided, and a TIA (trace impedance amplifier)/LA (limiting amplifier) 54 inputting an output of the photodiode 55 is provided.

In the ninth embodiment as stated above, the ring modulator group 50 operates similarly to the eighth embodiment. Accordingly, the ring resonant wavelengths $\lambda_1', \ldots, \lambda_8'$ are respectively locked at the wavelengths suitable for the modulation of the oscillation wavelengths $\lambda_1, \ldots, \lambda_8$, and it is possible to apply the appropriate modulation at the wavelengths.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

According to the optical semiconductor element and so on, it is possible to stably control a ring resonant wavelength to be one suitable for modulation owing to an operation of the light absorbing material.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

According to the above-stated optical semiconductor elements and so on, it is possible to stably control the ring resonant wavelengths suitable for the modulation owing to the operations of the light absorbing materials.

What is claimed is:

1. An optical semiconductor element, comprising:
   a ring modulator; and
   a light absorbing material provided at a position apart from a path for a modulated light which is guided by the ring modulator, the light absorbing material absorbing a light leaked out of a ring waveguide of the ring modulator, and increasing a temperature of the ring waveguide,
   wherein a heating value in a first relationship is larger than a heating value in a second relationship at a ring resonant wavelength giving a maximum to the first relationship, the first relationship being a relationship between a ring resonant wavelength and a heating value according to absorption of a resonance light in the ring waveguide, and the second relationship being a relationship between a heating value and a ring resonant wavelength which changes according to the heating value in the ring waveguide.

2. A method of controlling an optical semiconductor element, the method comprising:
   heating an optical semiconductor element to a particular temperature or more with a heater, the optical semiconductor element including:
   a ring modulator; and
   a light absorbing material provided at a position apart from a path for a modulated light which is guided by the ring modulator, the light absorbing material absorbing a light leaked out of a ring waveguide of the ring modulator, and increasing a temperature of the ring waveguide;
   starting incidence of a modulated light to the ring modulator; and
   after the starting, stopping the heating with the heater,
   wherein
   a heating value in a first relationship is larger than a heating value in a second relationship at a ring resonant wavelength giving a maximum to the first relationship, the first relationship being a relationship between a ring resonant wavelength and a heating value according to absorption of a resonance light in the ring waveguide, and the second relationship being a relationship between a heating value and a ring resonant wavelength which changes according to the heating value in the ring waveguide, and
   the particular temperature is a temperature corresponding to a nearest intersection on a short wavelength side from the ring resonant wavelength giving the maximum to the first relationship among intersections between a graphic chart representing the first relationship and a graphic chart representing the second relationship.

* * * * *